(12) United States Patent
Yasui

(10) Patent No.: US 7,143,728 B1
(45) Date of Patent: Dec. 5, 2006

(54) CONTROL APPARATUS

(75) Inventor: Yuji Yasui, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/433,476

(22) Filed: May 15, 2006

(30) Foreign Application Priority Data

May 25, 2005 (JP) .............................. 2005/152582

(51) Int. Cl.
*F01L 1/34* (2006.01)
(52) U.S. Cl. .............................. 123/90.15; 123/90.16; 123/90.31; 464/160
(58) Field of Classification Search ............. 123/90.15, 123/90.16, 90.17, 90.18, 90.27, 90.31; 464/1, 464/2, 160
See application file for complete search history.

(56) References Cited

U.S. PATENT DOCUMENTS 6,761,138 B1 * 7/2004 Takahashi et al. ....... 123/90.15
6,834,627 B1 * 12/2004 Hiraku et al. ............ 123/90.15

\* cited by examiner

*Primary Examiner*—Ching Chang
(74) *Attorney, Agent, or Firm*—Arent Fox PLLC

(57) ABSTRACT

A control apparatus that is capable of maintaining both the control resolution and the control accuracy at respective high levels even when at least one of the nonlinearity and the frequency characteristic of a controlled object varies. A control apparatus 1 that control a cam phase Cain by a phase control input Ucain includes two controllers 102 and 103. The two-degree-of-freedom response-specifying controller 102 calculates a follow-up control input Rsld as a value for causing the cam phase to follow a target cam phase Cain-_camd. The DSM controller 103 calculates a phase control input Ucain by modulating the follow-up control input Rsld, and in the calculation, the repetition period at which the phase control input Ucain is calculated is selected from two repetition periods $\Delta T1$ and $\Delta T2$ according to engine speed NE, a cam phase Cain, and a valve lift Liftin.

6 Claims, 23 Drawing Sheets

F I G. 1 7
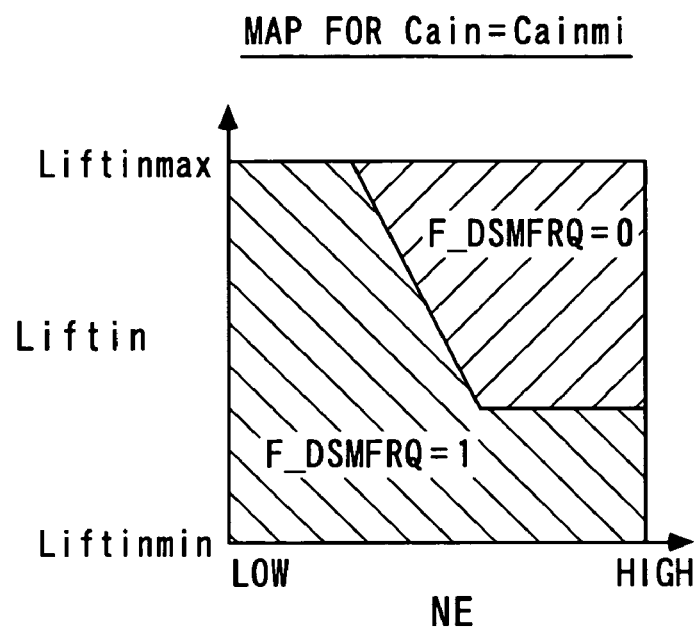
F I G. 1 8
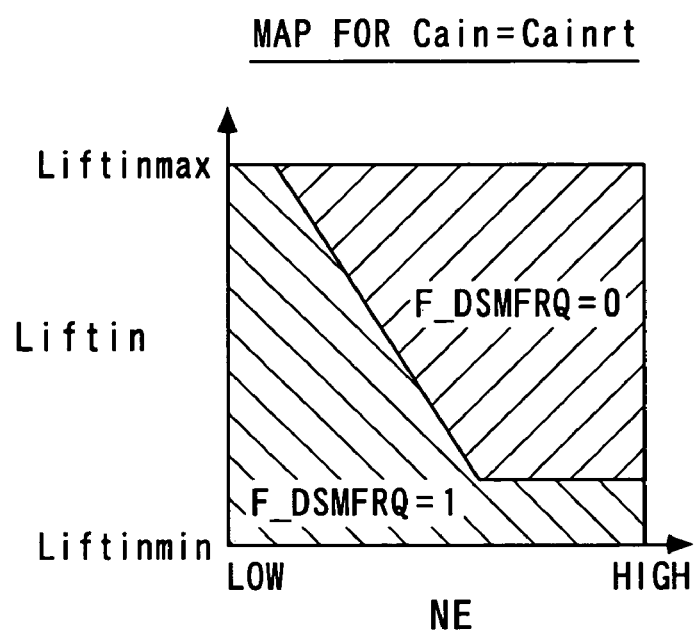

CONTROL APPARATUS

This application claims priority under 35 U.S.C. § 119(a) to Japanese Patent Application No. 152582/2005, filed on May 25, 2005.

BACKGROUND OF THE INVENTION

1. Field of the Invention

The present invention relates to a control apparatus that controls a controlled object which varies in nonlinearities, such as hysteresis and dead time, and frequency characteristic.

2. Description of the Related Art

Conventionally, there has been proposed a control apparatus that controls a variable cam phase mechanism as in Japanese Laid-Open Patent Publication (Kokai) No. 2001-132482. The variable cam phase mechanism varies the phase of an intake camshaft relative to a crankshaft of an internal combustion engine (hereinafter referred to as "the cam phase") as desired, and is hydraulically driven by oil pressure supplied from an oil pump. Further, the control apparatus includes a crank angle sensor and a cam angle sensor that detect respective signals corresponding to angular positions of the crankshaft and the intake camshaft, and a controller to which the detection signals from the sensors are input.

The controller calculates the actual cam phase based on the detection signals from the crank angle sensor and the cam angle sensor, and a target cam phase based on operating conditions of the engine, and further, calculates a control input to the variable cam phase mechanism with a sliding mode control algorithm, whereby the cam phase is controlled to follow the target cam phase.

It is generally known that the above-mentioned hydraulically-driven variable cam phase mechanism as a controlled object is high in friction, and is strong in nonlinearities, such as hysteresis and dead time. However, the control apparatus of Japanese Laid-Open Patent Publication (Kokai) No. 2001-132482 calculates the control input with the sliding mode control algorithm, and hence when the controlled object with strong nonlinearities, i.e. the hydraulically-driven variable cam phase mechanism is controlled, due to the strong nonlinearities, it is impossible to control the cam phase by the control input up to a slight degree of change, resulting in low control resolution and low control accuracy.

The present assignee has already proposed a control apparatus disclosed in Japanese Laid-Open Patent Publication (Kokai) No. 2005-63003 as a solution to the above-described problem with the control apparatus disclosed in Japanese Laid-Open Patent Publication (Kokai) No. 2001-132482. The proposed control apparatus controls an electromagnetically-driven variable cam phase mechanism, and includes a two-degree-of-freedom sliding mode controller, and a DSM controller. The two-degree-of-freedom sliding mode controller calculates a follow-up control input for causing the cam phase to follow a target cam phase with a target value filter-type two-degree-of-freedom sliding mode control algorithm at a predetermined repetition period. Further, the DSM controller modulates the calculated follow-up control input with an algorithm to which is applied the $\Delta\Sigma$ modulation algorithm, whereby the control input to the variable cam phase control mechanism is calculated at the predetermined repetition period as a value which is frequently repeatedly inverted with a predetermined amplitude with a predetermined value as the center of the inversion. As a result, even when the variable cam phase control mechanism with strong nonlinearities is controlled, the control input which is frequently repeated inverted can control the cam phase up to a slight degree of change, whereby the control resolution and the control accuracy can be enhanced.

In general, the variable cam phase mechanism has characteristics that the nonlinearity and the frequency characteristic of the cam phase with respect to the control input (sensitivity of the cam phase to the control input) varies with changes in the operating conditions of the engine. For example, during the cam phase control, an increase in the rotational variation of the engine increases the work of cam reaction forces (the urging forces of valve springs acting on the variable cam phase mechanism as a disturbance when the mechanism drivingly opens and closes the intake valves) per unit time and sprocket variation (i.e. chain speed variation and crank angle speed variation), whereby the sensitivity of the cam phase to the control input, particularly, the sensitivity to high-frequency components thereof becomes higher. Further, when oil pressure is supplied to the hydraulically-driven variable cam phase mechanism from an oil pump using the torque of the engine as a drive source, variation in the engine speed causes variation in the oil pressure supplied to the variable cam phase mechanism, which causes variation in the frequency characteristic and the nonlinearity of the cam phase with respect to the control input.

The control apparatus disclosed in Japanese Laid-Open Patent Publication (Kokai) No. 2005-63003, however, calculates the control input at the predetermined repetition period. Therefore, if the nonlinearity and frequency characteristic vary, the repetition period deviates from the proper value, which causes the inverting behavior of the control input to be reflected in the cam phase in a noise-like fashion, or makes the control system unstable (resonant). In such a case, the control resolution and the control accuracy are degraded.

SUMMARY OF THE INVENTION

The present invention has been made to provide a solution to the above-described problem, and an object thereof is to provide a control apparatus that is capable of maintaining both the control resolution and the control accuracy at respective high levels even when at least one of the nonlinearity and the frequency characteristic of a controlled object varies.

To attain the above object, the present invention provides a control apparatus for controlling a controlled variable of a controlled object by a control input, comprising controlled variable-detecting means for detecting the controlled variable, target value-setting means for setting a target value as a target of the controlled variable, follow-up control input-calculating means for calculating a follow-up control input for controlling the detected controlled variable such that the detected controlled variable is caused to follow the set target value, with a predetermined control algorithm, and control input-calculating means for calculating the control input by modulating the calculated follow-up control input with algorithms including a predetermined modulation algorithm, and selecting a repetition period at which the control input is calculated from a plurality of predetermined repetition periods, according to a parameter indicative of a state of the controlled object.

With the configuration of the control apparatus according to the present invention, the follow-up control input for causing the controlled variable to follow the target value is calculated with a predetermined control algorithm, and the control input is calculated by modulating the follow-up control input with algorithms including a predetermined modulation algorithm. The repetition period at which the control input is calculated is selected from a plurality of repetition periods according to a parameter indicative of a state of the controlled object. Therefore, even when at least one of the nonlinearity and the frequency characteristic of the controlled object varies due to a change in the state of the controlled object, the control input can be calculated at a proper repetition period coping with such a change. As a result, by using the control input thus calculated, it is possible to cause the controlled variable to properly follow the target value while preventing the inverting behavior of the control input from appearing in the controlled variable or preventing the control system from becoming unstable, whereby it is possible to maintain the control resolution and the control accuracy at respective high levels (it should be noted that throughout the specification, the term "calculation" as in "calculation of the follow-up control input" and "calculation of the control input" is not limited to computation of such an amount or a value with a program, but includes generation of an electric signal indicative of such an amount or a value, with an electric circuit.

Preferably, the control input-calculating means divides the follow-up control input into a plurality of input components, and calculates the control input based on an input component formed by modulating one of the input components with the predetermined modulation algorithm and other input components than the one input component.

With the configuration of the preferred embodiment, the control input is calculated based on a value formed by modulating one of a plurality of input components obtained by dividing the follow-up control input, and the other input components. Therefore, even when there occurs a state in which the controlled variable largely deviates from the target value, and the range of variation in the follow-up control input is large, by properly setting the amplitude of the value formed by modulating the one input component, it is possible to prevent the amplitude of the control input from becoming excessively large, to thereby cause the controlled variable to follow the target value while preventing the inverting state of the control input from being reflected in the controlled variable in a noise-like fashion. As a result, it is possible to further enhance the control resolution and the control accuracy.

Preferably, the predetermined algorithm is based one of a $\Delta \Sigma$ modulation algorithm, a $\Sigma \Delta$ modulation algorithm, and a $\Delta$ modulation algorithm.

With the configuration of the preferred embodiment, the control input is calculated by modulating the follow-up control input with algorithms including a modulation algorithm based on a $\Delta \Sigma$ modulation algorithm, a $\Sigma \Delta$ modulation algorithm, or a $\Delta$ modulation algorithm. In this case, all of the $\Delta \Sigma$ modulation algorithm, the $\Sigma \Delta$ modulation algorithm, and the $\Delta$ modulation algorithm have a characteristic that as a value input thereto becomes closer to a value of 0, the inverting frequency of a value calculated therewith become higher. On the other hand, the follow-up control input is a value for controlling the controlled variable such that it is caused to follow the target value, and hence as the controlled variable becomes closer to the target value, the follow-up control input undergoes a less change. Therefore, by configuring the modulation algorithm based on one of the $\Delta \Sigma$ modulation algorithm, the $\Sigma \Delta$ modulation algorithm, or the $\Delta$ modulation algorithm, such that when the follow-up control input undergoes less or almost no change, the value input to the one of the $\Delta \Sigma$ modulation algorithm, the $\Sigma \Delta$ modulation algorithm, and the $\Delta$ modulation algorithm becomes close to a value of 0, it is possible to calculate the control input such that as the controlled variable becomes closer to the target value, the inverting frequency of the control input becomes higher. As a result, it is possible to improve the convergence of the controlled variable to the target value, compared with the case in which the phase control input is calculated by PWM or dithering with a fixed inverting frequency.

Preferably, the controlled variable is a phase of at least one of an intake camshaft and an exhaust camshaft of an internal combustion engine, relative to a crankshaft of the engine.

With the configuration of the preferred embodiment, when the phase of the intake camshaft and/or the exhaust camshaft relative to the crankshaft is controlled by the control input, it is possible to maintain the control resolution and the control accuracy at respective high levels, as described hereinabove.

Preferably, the controlled variable is a lift of at least one of each of intake valves and each of exhaust valves of an internal combustion engine.

With the configuration of the preferred embodiment, when the lift of the intake valves and/or the exhaust valves is controlled by the control input, it is possible to maintain the control resolution and the control accuracy at respective high levels, as described hereinabove.

Preferably, the controlled variable is an air-fuel ratio parameter indicative of an air-fuel ratio of a mixture supplied to an internal combustion engine.

With the configuration of the preferred embodiment, when the air-fuel ratio parameter indicative of the air-fuel ratio of a mixture supplied to the engine is controlled by the control input, it is possible to maintain the control resolution and the control accuracy at respective high levels, as described hereinabove.

The above and other objects, features, and advantages of the present invention will become more apparent from the following detailed description taken in conjunction with the accompanying drawings.

BRIEF DESCRIPTION OF THE DRAWINGS

FIG. 17 is a diagram showing an example of a map for Cain=Cainmi for use in setting the modulated value selection flag F_DSMFRQ;

FIG. 18 is a diagram showing an example of a map for Cain=Cainrt for use in setting the modulated value selection flag F_DSMFRQ;

DETAILED DESCRIPTION OF PREFERRED EMBODIMENTS

Figure 2:
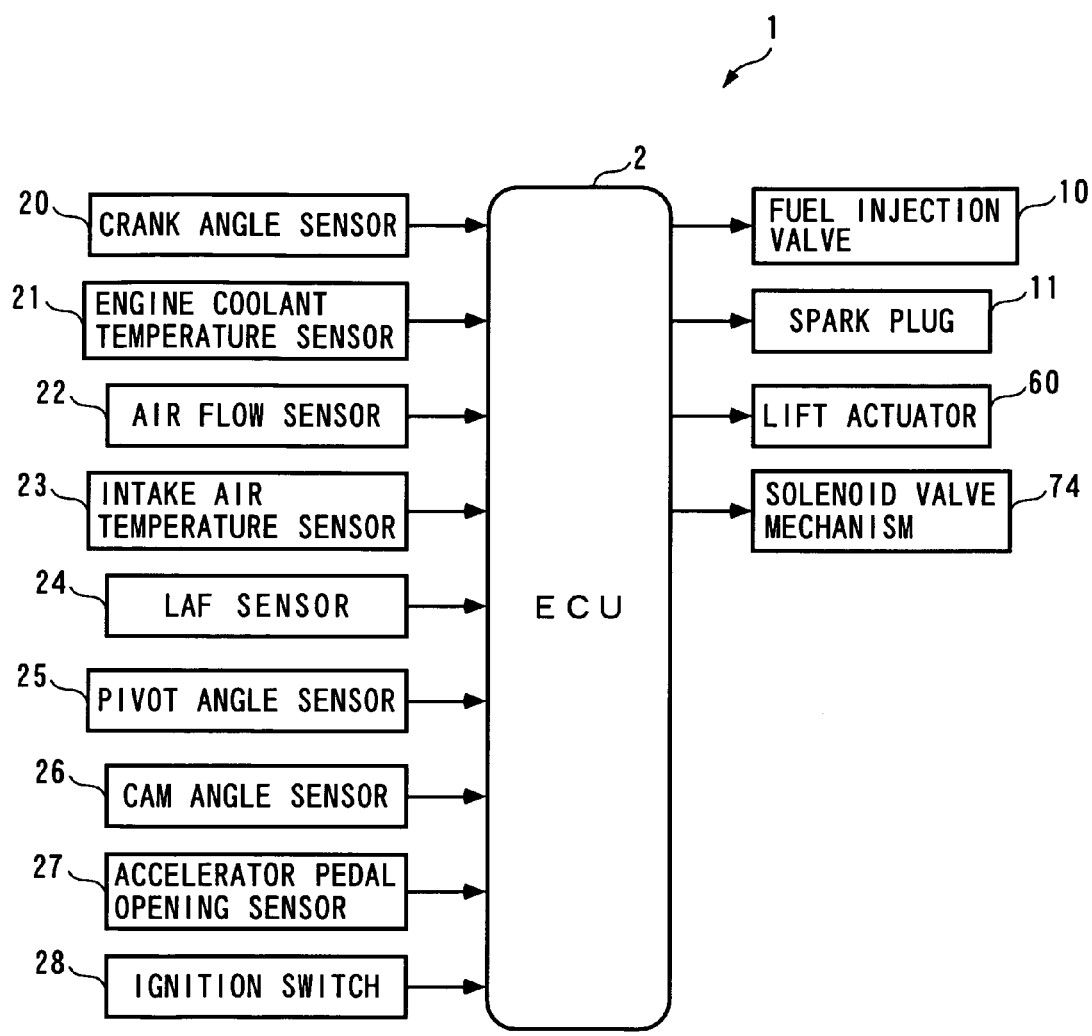
FIG. 2 is a schematic block diagram of the control apparatus.

Hereafter, a control apparatus for an internal combustion engine, according a first embodiment of the present invention, will be described with reference to the drawings. As shown in FIG. 2, the control apparatus 1 includes an ECU 2. As described hereinafter, the ECU 2 carries out various control processes for controlling a cam phase, a valve lift, etc., depending on operating conditions of an internal combustion engine (hereinafter simply referred to as "the engine") 3.

Figure 1:
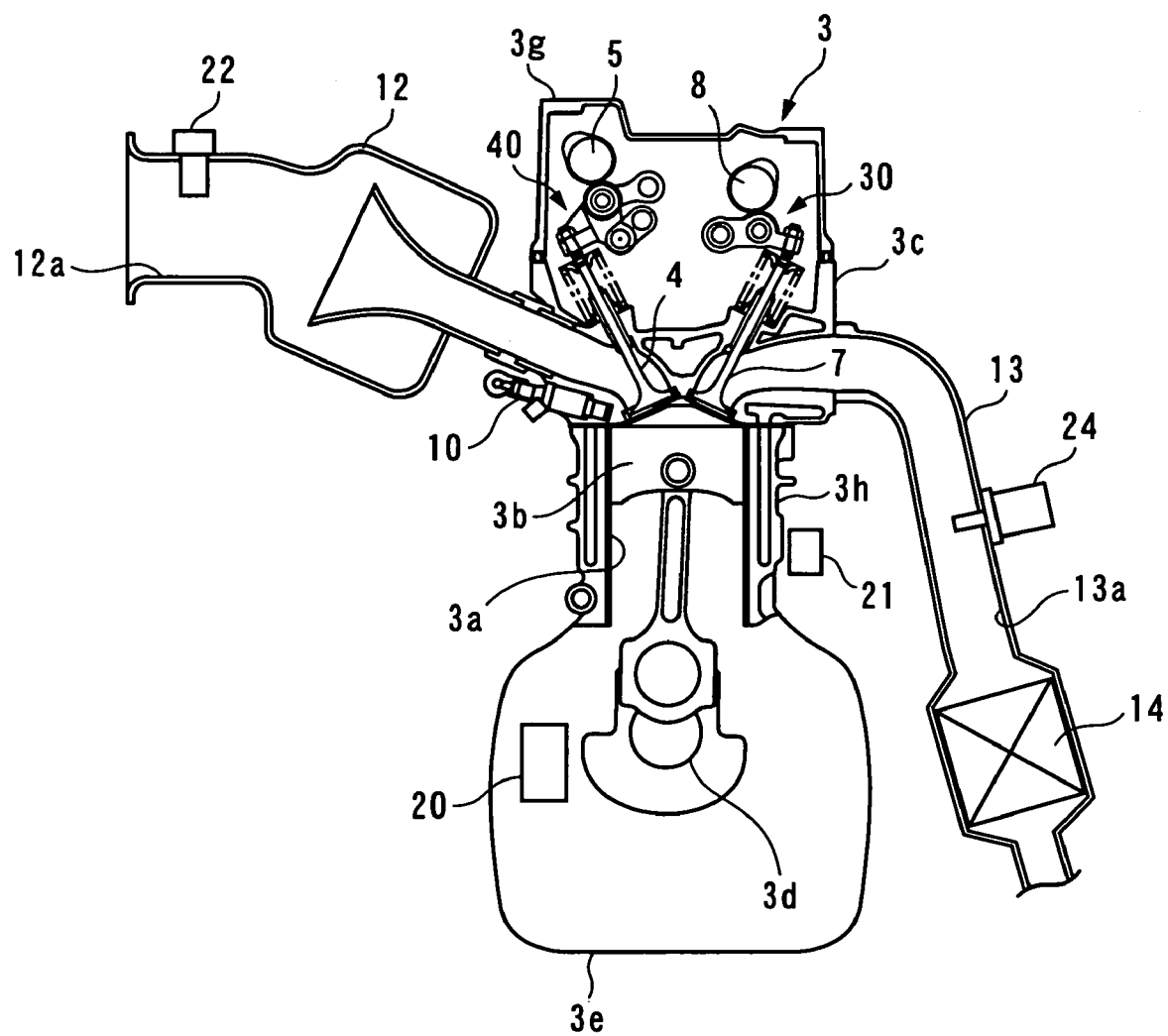
FIG. 1 is a schematic diagram of an internal combustion engine to which is applied a control apparatus according to a first embodiment of the present invention.
Figure 3:
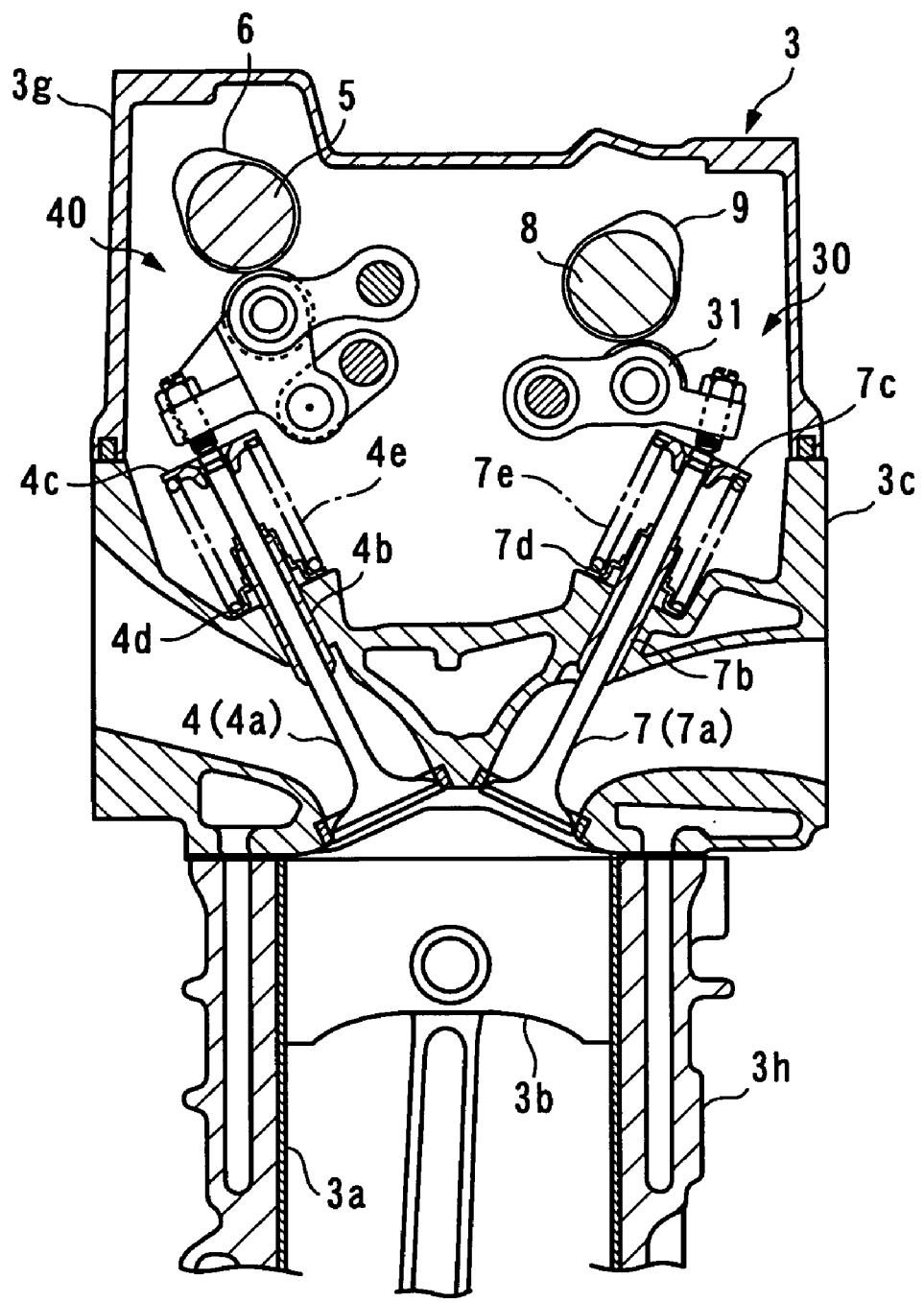
FIG. 3 is a schematic cross-sectional view of a variable intake valve-actuating mechanism and an exhaust valve-actuating mechanism of the engine.

Referring to FIGS. 1 and 3, the engine 3 is an in-line four-cylinder gasoline engine having a four pairs of cylinders 3a and pistons 3b (only one pair of which is shown), and installed on a vehicle, not shown. The engine 3 includes an intake valve 4 and an exhaust valve 7 provided for each cylinder 3a, for opening and closing an intake port and an exhaust port thereof, respectively, an intake camshaft 5 and intake cams 6 for actuating the intake valves 4, a variable intake valve-actuating mechanism 40 that actuates the intake valves 4 to open and close the same, an exhaust camshaft 8 and exhaust cams 9 for actuating the exhaust valves 7, an exhaust valve-actuating mechanism 30 that actuates the exhaust valves 7 to open and close the same, fuel injection valves 10, spark plugs 11 (see FIG. 2), and so forth.

Figure 4:
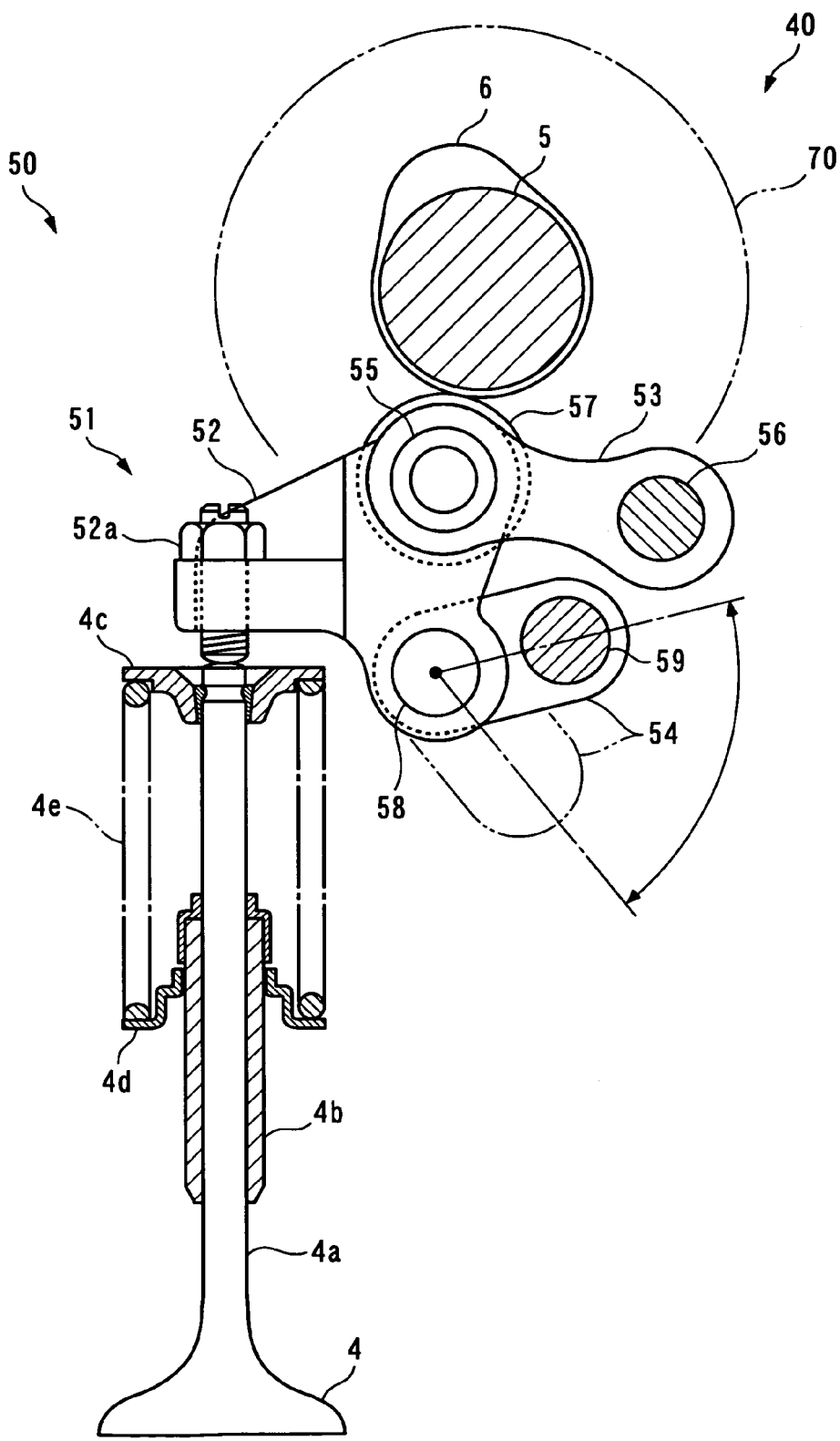
FIG. 4 is a schematic cross-sectional view of a variable valve lift mechanism of the variable intake valve-actuating mechanism.

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and is urged by the valve spring 4e in the valve-closing direction.

Further, the intake camshaft 5 and the exhaust camshaft 8 are rotatably mounted through the cylinder head 3c via holders, not shown. The intake camshaft 5 has an intake sprocket (not shown) coaxially and rotatably fitted on one end thereof. The intake sprocket is connected to a crankshaft 3d via a timing chain, not shown, and connected to the intake camshaft 5 via a variable cam phase mechanism 70, described hereinafter. With the above arrangement, the intake camshaft 5 performs one rotation per two rotations of the crankshaft 3d. Further, the intake cam 6 is provided on the intake camshaft 5 for each cylinder 3a such that the intake cam 6 rotates in unison with the intake camshaft 5.

Furthermore, the variable intake valve-actuating mechanism 40 is provided for actuating the intake valve 4 of each cylinder 3a so as to open and close the same, in accordance with rotation of the intake camshaft 5, and continuously changing the lift and the valve timing of the intake valve 4, which will be described in detail hereinafter. It should be noted that in the present embodiment, "the lift of the intake valve 4" (hereinafter referred to as "the valve lift"), represents the maximum lift of the intake valve 4.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and is urged by the valve spring 7e in the valve-closing direction.

Further, the exhaust camshaft 8 has an exhaust sprocket (not shown) integrally formed therewith, and is connected to the crankshaft 3d by the exhaust sprocket and the timing chain, not shown, whereby the exhaust camshaft 8 performs one rotation per two rotations of the crankshaft 3d. Further, the exhaust cam 9 is provided on the exhaust camshaft 8 for each cylinder 3a such that the exhaust cam 9 rotates in unison with the exhaust camshaft 8.

Further, the exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

On the other hand, the fuel injection valve 10 is provided for each cylinder 3a, and mounted through the cylinder head 3c in a tilted state such that fuel is directly injected into a combustion chamber. That is, the engine 3 is configured as a direct injection engine. Further, the fuel injection valve 10 is electrically connected to the ECU 2 and the valve-opening time period and the valve-opening timing thereof are controlled by the ECU 2, whereby the fuel injection amount is controlled.

The spark plug 11 as well is provided for each cylinder 3a, and mounted through the cylinder head 3c. The spark plug 11 is electrically connected to the ECU 2, and a state of spark discharge is controlled by the ECU 2 such that a mixture in the combustion chamber is burned in timing corresponding to ignition timing.

On the other hand, the engine 3 is provided with a crank angle sensor 20 and an engine coolant temperature sensor 21. The crank angle sensor 20 is comprised of a magnet rotor and an MRE (magnetic resistance element) pickup, and delivers a CRK signal, which is a pulse signal,to the ECU 2 in accordance with rotation of the crankshaft 3d. Each pulse of the CRK signal is generated whenever the crankshaft 3d rotates through a predetermined angle (e.g. 10°). The ECU 2 calculates the rotational speed NE of the engine 3 (hereinafter referred to as "the engine speed NE") based on the CRK signal. In the present embodiment, the crank angle sensor 20 corresponds to controlled variable-detecting means.

The engine coolant temperature sensor 21 is implemented e.g. by a thermistor, and detects an engine coolant temperature TW to deliver a signal indicative of the sensed engine coolant temperature TW to the ECU 2. The engine coolant temperature TW is the temperature of an engine coolant circulating through a cylinder block 3h of the engine 3.

Further, the engine 3 has an intake pipe 12 from which a throttle valve mechanism is omitted, and an intake passage 12a having a large diameter is formed through the intake pipe 12, whereby the engine 3 is configured such that flow resistance is smaller than in an ordinary engine. The intake pipe 12 is provided with an air flow sensor 22 and an intake air temperature sensor 23 (see FIG. 2).

The air flow sensor 22 is formed by a hot-wire air flow meter, and detects the flow rate Gin of air flowing through the intake passage 12a (hereinafter referred to as "the air flow rate Gin") to deliver a signal indicative of the sensed air flow rate Gin to the ECU 2. The ECU 2 calculates the intake air amount Gcyl based on the air flow rate Gin and the engine speed NE. Further, the intake air temperature sensor 23 detects the temperature TA of the air flowing through the intake passage 12a (hereinafter referred to as "the intake air temperature TA"), and delivers a signal indicative of the sensed intake air temperature TA to the ECU 2.

Further, a LAF sensor 24 and a catalytic converter 14 are inserted into an exhaust pipe 13 of the engine 3 at respective locations in this order from upstream side. The LAF sensor 24 is comprised of a zirconia layer and platinum electrodes, and linearly detects the concentration of oxygen in exhaust gases flowing through an exhaust passage 13a of the exhaust pipe 13, in a broad air-fuel ratio range from a rich region richer than the stoichiometric ratio to a very lean region, to deliver a signal indicative of the sensed oxygen concentration to the ECU 2. The ECU 2 calculates an actual air-fuel ratio Vex indicative of an air-fuel ratio in the exhaust gases, based on a value of the signal output from the LAF sensor 24.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70.

The variable valve lift mechanism 50 actuates the intake valves 4 to open and close the same, in accordance with rotation of the intake camshaft 5, and continuously changes the valve lift Liftin between a predetermined maximum value Liftinmax and a predetermined minimum value Liftinmin. The variable valve lift mechanism 50 is comprised of rocker arm mechanisms 51 of a four joint link type, provided for the respective cylinders 3a, and a lift actuator 60 (see FIGS. 5A and 5B) simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65, described hereinafter, of the lift actuator 60 by the connection shaft 59.

Figure 5A:
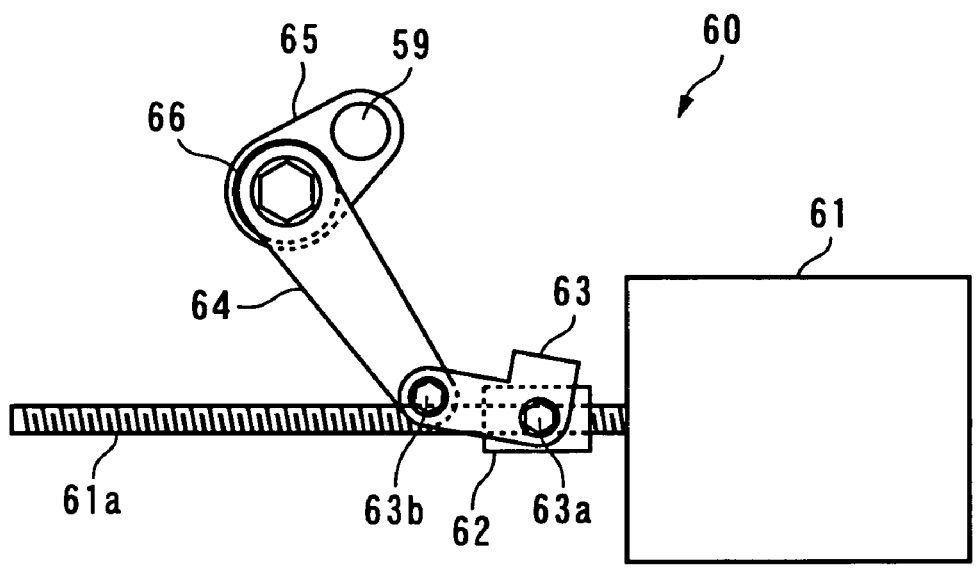
FIG. 5A is a diagram showing a lift actuator in a state in which a short arm thereof is in a maximum lift position.
Figure 5B:
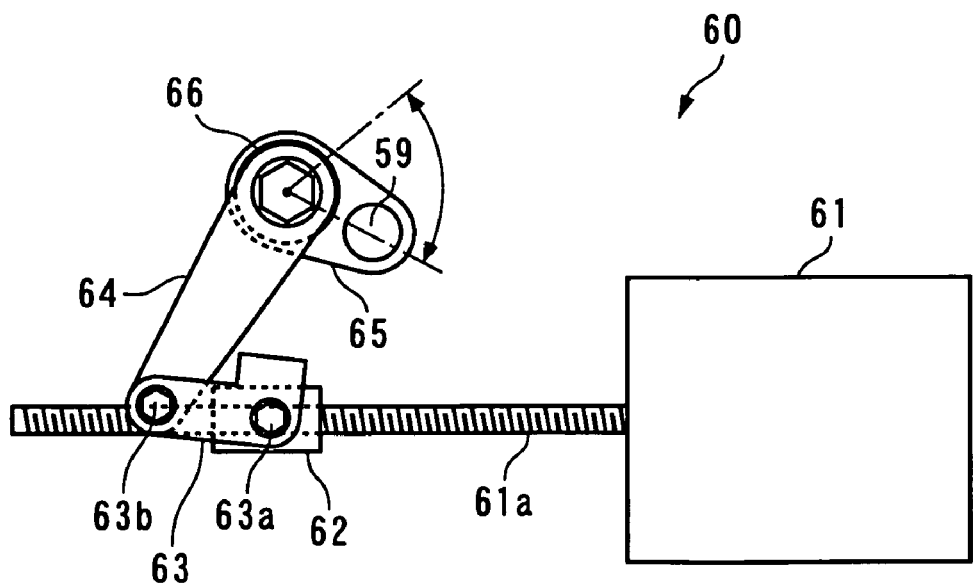
FIG. 5B is a diagram showing the lift actuator in a state in which the short arm thereof is in the minimum lift position.

On the other hand, as shown in FIGS. 5A and 5B, the lift actuator 60 is comprised of a motor 61, a nut 62, a link 63, a long arm 64, and the short arm 65. The motor 61 is connected to the ECU 2, and disposed outside a head cover 3g of the engine 3. The rotating shaft of the motor 61 is a screw shaft 61a formed with a male screw and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3g of the engine 3 such that it is pivotally supported by the head cover 3g. The long arm 64 and the short arm 65 are pivotally moved in unison with the pivot shaft 66 in accordance with pivotal motion of the pivot shaft 66.

Furthermore, the aforementioned connection shaft 59 rotatably extends through the other end of the short arm 65, whereby the short arm 65 is connected to the lower link 54 by the connection shaft 59.

Next, a description will be given of the operation of the variable valve lift mechanism 50 constructed as above. In the variable valve lift mechanism 50, when a lift control input Uliftin, described hereinafter, is input from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

During the above process, under the control of the ECU 2, the range of pivotal motion of the short arm 65 is restricted between the maximum lift position shown in FIG. 5A and the minimum lift position shown in FIG. 5B, whereby the range of pivotal motion of the lower link 54 is also restricted between the maximum lift position indicated by the solid line in FIG. 4 and the minimum lift position indicated by the two-dot chain line in FIG. 4.

Figure 6A:
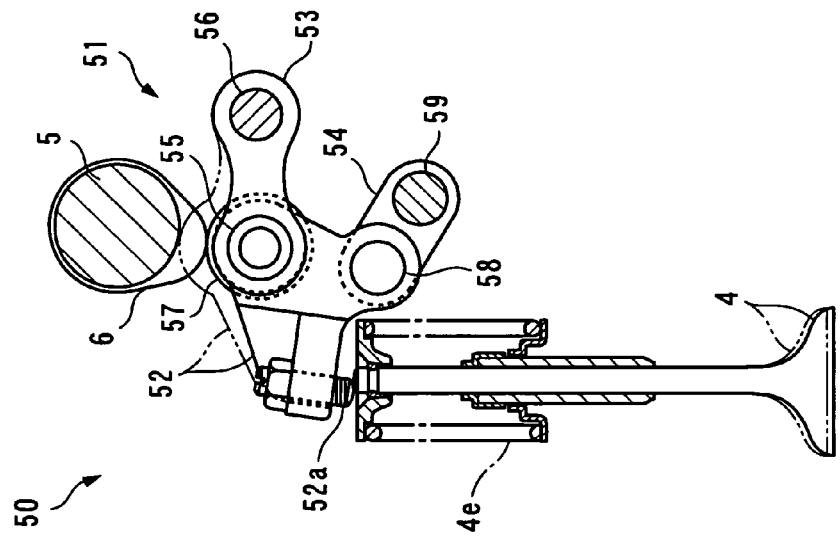
FIG. 6A is a diagram showing an intake valve placed in an open state when a lower link of the variable valve lift mechanism is in a maximum lift position.

The four joint link formed by the rocker arm shaft 56, the upper and lower pins 55 and 58, and the connection shaft 59 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6A, when the intake cam 6 rotates, the amount of movement of the adjusting bolt 52a becomes larger than the amount of movement of a contact point where the intake cam 6 and the roller 57 are in contact with each other.

Figure 6B:
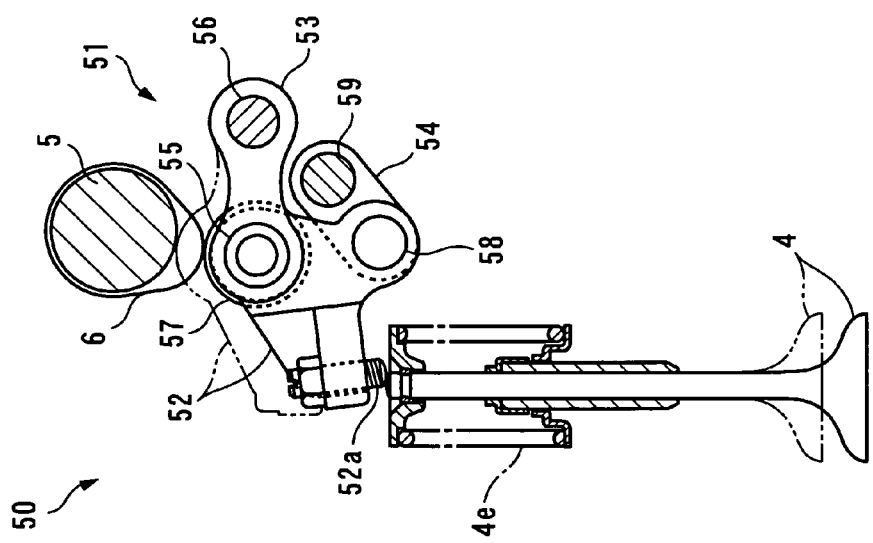
FIG. 6B is a diagram showing the intake valve placed in an open state when the lower link of the variable valve lift mechanism is in the minimum lift position.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 6B, when the intake cam 6 rotates, the amount of movement of the adjusting bolt 52a becomes smaller than the amount of movement of the contact point where the intake cam 6 and the roller 57 are in contact with each other.

Figure 7:
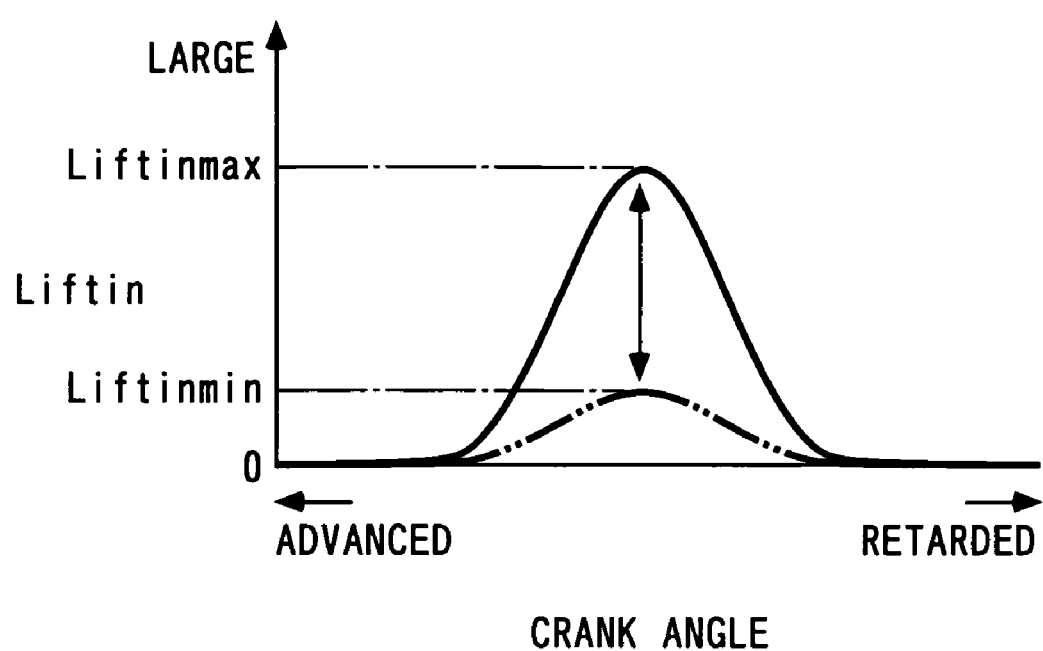
FIG. 7 is a diagram showing a valve lift curve (solid line) obtained when the lower link of the variable valve lift mechanism is in the maximum lift position, and a valve lift curve (two-dot chain line) obtained when the lower link of the variable valve lift mechanism is in the minimum lift position.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftinmax. On the other hand, when the lower link 54 is in the minimum lift position, the intake valve 4 is opened according to a valve lift curve indicated by a two-dot chain line in FIG. 7, and the valve lift Liftin assumes its minimum value Liftinmin.

Therefore, in the variable valve lift mechanism 50, the lower link 54 is pivotally moved by the lift actuator 60 between the maximum lift position and the minimum lift position, whereby it is possible to steplessly change the valve lift Liftin between the maximum value Liftinmax and the minimum value Liftinmin.

In the case of the variable valve lift mechanism 50 constructed as above, when the intake camshaft 5 rotates, the urging force of each valve spring 4e of the intake valve 4 is received as a cam reaction force. The cam reaction force is transmitted to the motor 61 via the lower link 54, the connection shaft 59, and the two arms 65 and 64, as a periodic oscillating disturbance, thereby vibrating the same. During the process, the amplitude of the disturbance received by the motor 61 is larger in a low engine speed region than in a medium-to-high engine speed region, and varies with the change in the angle of the lower link 54 (i.e. the frequency characteristic of the variable valve lift 50 varies), and particularly, when the lower link 54 is in the minimum lift position i.e. when Liftin=Liftinmin holds, the amplitude of the disturbance received by the motor 61 becomes largest. Thus, when the motor 61 is vibrating with a large amplitude, if the inverting frequency of the lift control input Uliftin, referred to hereinafter, assumes a value close to the frequency of the vibration of the motor 61, the motor 61 undergoes resonance, which lowers the resolution i.e. controllability of valve lift control. Therefore, in the valve lift control, described hereinafter, the lift control input Uliftin is calculated such that a resonance can be avoided.

It should be noted that the variable valve lift mechanism 50 is provided with a lock mechanism, not shown, and the lock mechanism locks the operation of the variable valve lift mechanism 50 when the lift control input Uliftin is set to a value of 0, as described hereinafter, and when the lift control input Uliftin is not input from the ECU 2 to the lift actuator 60 e.g. due to a disconnection. That is, the variable valve lift mechanism 50 is inhibited from changing the valve lift Liftin, whereby the valve lift Liftin is held at the minimum value Liftinmin. It should be noted that when a cam phase Cain is held at a predetermined locked value, referred to hereinafter, the minimum value Liftinmin is set to such a value as will ensure a predetermined failure-time value of the intake air amount. The predetermined failure-time value is set to a value which is capable of suitably carrying out idling or starting of the engine 3 during stoppage of the vehicle, and capable of holding the vehicle in a state of low-speed traveling when the vehicle is traveling.

The engine 3 is provided with a pivot angle sensor 25 (see FIG. 2). The pivot angle sensor 25 detects a pivot angle of the rotating shaft 66 i.e. the short arm 65, and delivers a signal indicative of the detected pivot angle of the short arm 65 to the ECU 2. The ECU 2 calculates the valve lift Liftin based on the detection signal from the pivot angle sensor 25. In the present embodiment, the pivot angle sensor 25 corresponds to the controlled variable-detecting means.

Figure 8:
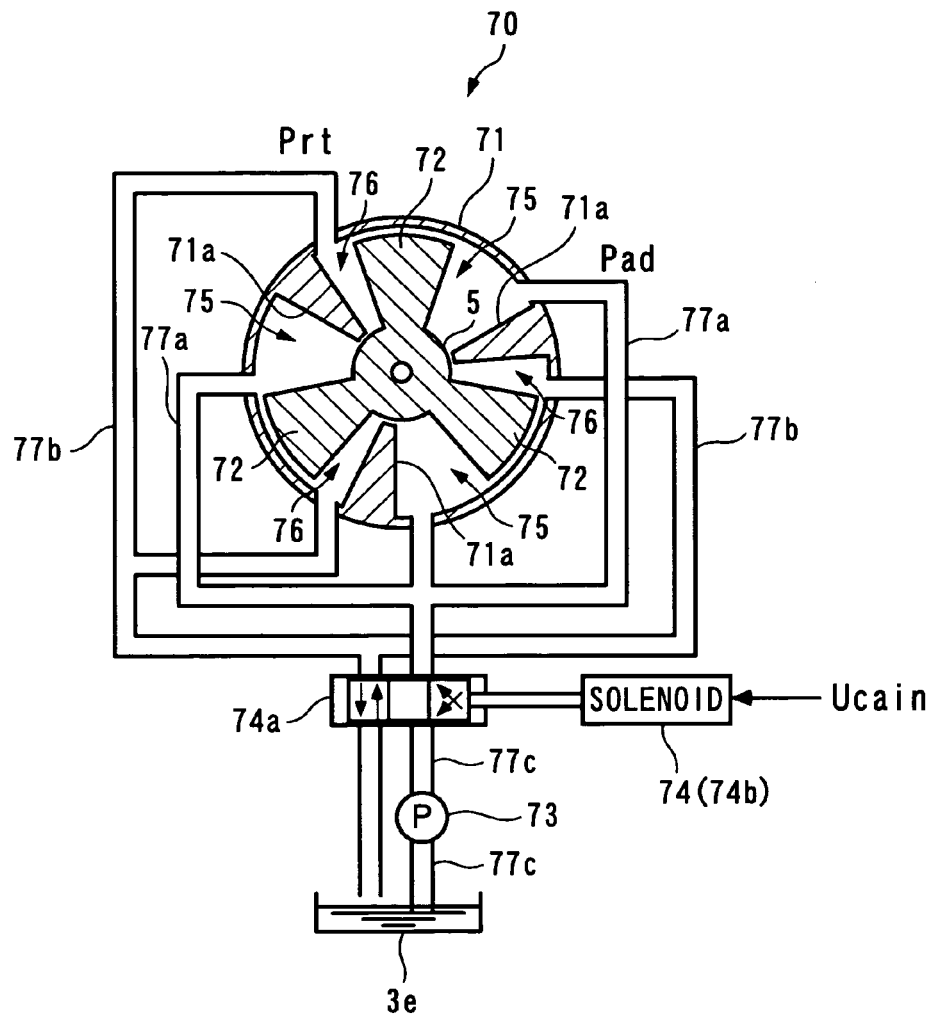
FIG. 8 is a schematic diagram of a variable cam phase mechanism.

Next, a description will be given of the aforementioned variable cam phase mechanism 70. The variable cam phase mechanism 70 is provided for continuously advancing or retarding the relative phase Cain of the intake camshaft 5 with respect to the crankshaft 3d (hereinafter referred to as "the cam phase Cain"), and mounted on an intake sprocket-side end of the intake camshaft 5. As shown in FIG. 8, the variable cam phase mechanism 70 includes a housing 71, a three-bladed vane 72, an oil pressure pump 73, and a solenoid valve mechanism 74.

The housing 71 is integrally formed with the intake sprocket on the intake camshaft 5, and divided by three partition walls 71a formed at equal intervals. The vane 72 is coaxially mounted on the intake sprocket-side end of the intake camshaft 5, such that the vane 72 radially extends outward from the intake camshaft 5, and rotatably housed in the housing 71. Further, the housing 71 has three advance chambers 75 and three retard chambers 76 each formed between one of the partition walls 71a and one of the three blades of the vane 72.

The oil pressure pump 73 is of a mechanical type which is connected to the crankshaft 3d. As the crankshaft 3d rotates, the oil pressure pump 73 draws lubricating oil stored in an oil pan 3e of the engine 3 via an oil passage 77c, for pressurization, and supplies the pressurized oil to the solenoid valve mechanism 74 via the oil passage 77c.

The solenoid valve mechanism 74 is formed by combining a spool valve mechanism 74a and a solenoid 74b, and is connected to the advance chambers 75 and the retard chambers 76 via an advance oil passage 77a and a retard oil passage 77b such that oil pressure supplied from the oil pressure pump 73 is output to the advance chambers 75 and the retard chambers 76 as advance oil pressure Pad and retard oil pressure Prt. The solenoid 74b of the solenoid valve mechanism 74 is electrically connected to the ECU 2. When a phase control input Ucain, referred to hereinafter, is input from the ECU 2, the solenoid 74b moves a spool valve element of the spool valve mechanism 74a within a predetermined range of motion according to the phase control input Ucain to thereby change both the advance oil pressure Pad and the retard oil pressure Prt.

Figure 9:
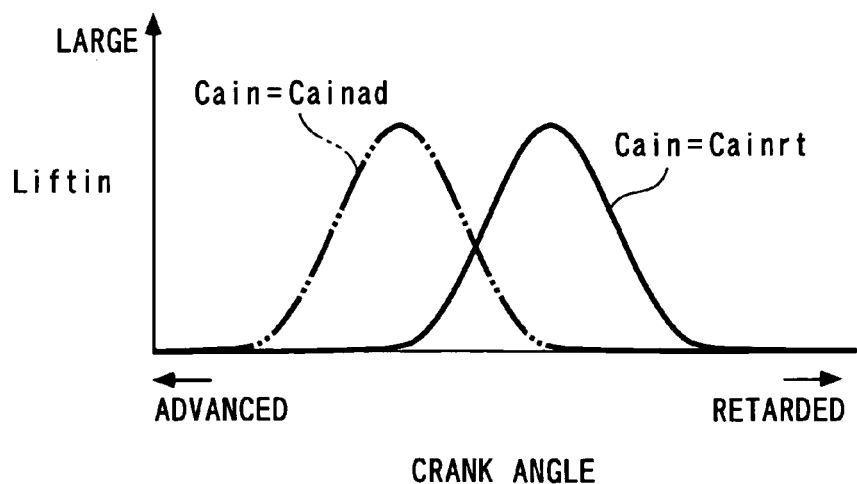
FIG. 9 is a diagram showing a valve lift curve (solid line) obtained when a cam phase is set to a most retarded value by the variable cam phase mechanism, and a valve lift curve (two-dot chain line) obtained when the cam phase is set to a most advanced value by the variable cam phase mechanism.

In the variable cam phase mechanism 70 constructed as above, during operation of the oil pressure pump 73, the solenoid valve mechanism 74 is operated according to the phase control input Ucain, to supply the advance oil pressure Pad to the advance chambers 75 and the retard oil pressure Prt to the retard chambers 76, whereby the relative phase between the vane 72 and the housing 71 is changed toward an advanced side or a retarded side. As a result, the cam phase Cain described above is continuously changed between a most retarded value Cainrt and a most advanced value Cainad, whereby valve timing of the intake valve 4 is continuously changed between a most retarded timing indicated by a solid line in FIG. 9 and a most advanced timing indicated by a two-dot chain line in FIG. 9. It should be noted that in the control process, described hereinafter, the most retarded value Cainrt is set to 0°, and the most retarded value Cainad is set to a predetermined positive angle (e.g. 100°).

The hydraulically-driven variable cam phase mechanism 70 constructed as above has a characteristic that with a change in the engine speed NE, the sensitivity (frequency characteristic) and nonlinearity of the cam phase Cain to the phase control input Ucain vary. For example, during the cam phase control, when the variation in the engine speed of the engine 3 increases, the work by the cam reaction force per unit time, and sprocket variation (i.e. chain speed variation or crank angular speed variation) increase, whereby the sensitivity of the cam phase Cain to the phase control input Ucain becomes high. Particularly, the sensitivity of the cam phase Cain to high-frequency components of the phase control input Ucain (hereinafter, referred to as "high-frequency sensitivity") becomes high. Further, when the engine speed NE lowers, the supply oil pressure from the oil pump 73 lowers, increasing nonlinearities, such as dead time and hysteresis. Therefore, in the cam phase control, described hereinafter, the phase control input Ucain is calculated in a manner coping with such changes in the sensitivity and the nonlinearity.

It should be noted that the variable cam phase mechanism 70 is provided with a lock mechanism, not shown, which locks operation of the variable cam phase mechanism 70, when oil pressure supplied from the oil pressure pump 73 is low, when the phase control input Ucain is set to a value of 0, or when the phase control input Ucain is not input to the solenoid valve mechanism 74 e.g. due to a disconnection. That is, the variable cam phase mechanism 70 is inhibited from changing the cam phase Cain, whereby the cam phase Cain is held at the predetermined locked value. When the cam phase Cain is held at the predetermined locked value and at the same time the valve lift Liftin is held at the minimum value Liftinmin, as described above, the predetermined failure time value is secured as the intake air amount, as described hereinabove.

On the other hand, a cam angle sensor 26 (see FIG. 2) is disposed at an end of the intake camshaft 5 opposite from the variable cam phase mechanism 70. The cam angle sensor 26 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. 1°). The ECU 2 calculates the cam phase Cain based on the CAM signal and the CRK signal, described above. In the present embodiment, the cam angle sensor 26 corresponds to the controlled variable-detecting means.

Thus, the cam phase Cain is calculated based on the two pulse signals intermittently generated along with the rotations of the crankshaft 3d and the intake camshaft 5, and hence the repetition period at which the cam phase Cain is calculated becomes longer when the engine 3 is in a low engine speed region than when the same is in a medium-to-high engine speed region, which causes lowering of the control resolution in the low engine speed region during the cam phase control. Therefore, in the cam phase control, described hereinafter, the phase control input Ucain is calculated in a manner coping with the lowering of the control resolution in the low engine speed region.

Next, as shown in FIG. 2, connected to the ECU 2 are an accelerator pedal opening sensor 27, and an ignition switch (hereinafter referred to as "the IG. SW") 28. The accelerator pedal opening sensor 27 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2. Further, the IG.SW 28 is turned on or off by operation of an ignition key, not shown, and delivers a signal indicative of the ON/OFF state thereof to the ECU 2.

The ECU 2, which is implemented by a microcomputer comprised of a CPU, a RAM, a ROM and an I/O interface (none of which are shown), determines operating conditions of the engine 3 based on the detection signals from the aforementioned sensors 20 to 27, the ON/OFF signal from the IG.SW 28, and so forth, and executes the various control processes. More particularly, the ECU 2 controls the cam phase Cain and the valve lift Liftin via the variable cam phase mechanism 70 and the variable valve lift mechanism 50 depending on operating conditions of the engine 3, to thereby control the intake air amount. Further, although not shown, the ECU 2 controls the fuel injection amount via the fuel injection valves 10.

It should be noted that in the present embodiment, the ECU 2 corresponds to the controlled variable-detecting means, target value-setting means, follow-up control input-calculating means, and control input-calculating means.

Next, a description will be given of the control apparatus 1 according to the present embodiment. The control apparatus 1 includes a cam phase controller 100 (see FIG. 10), and a valve lift controller 200 (see FIG. 11), both of which are implemented by the ECU 2.

Next, the cam phase controller 100 will be described with reference to FIG. 10. The cam phase controller 100 controls the cam phase Cain as a controlled variable by inputting the phase control input Ucain to a controlled object 90. The controlled object 90 corresponds to a system including the variable cam phase mechanism 70.

The cam phase controller 100 calculates, as described in detail hereinbelow, the phase control input Ucain, and the phase control input Ucain is input to the controlled object 90, whereby the cam phase Cain is controlled such that it follows the target cam phase Cain_cmd.

Figure 10:
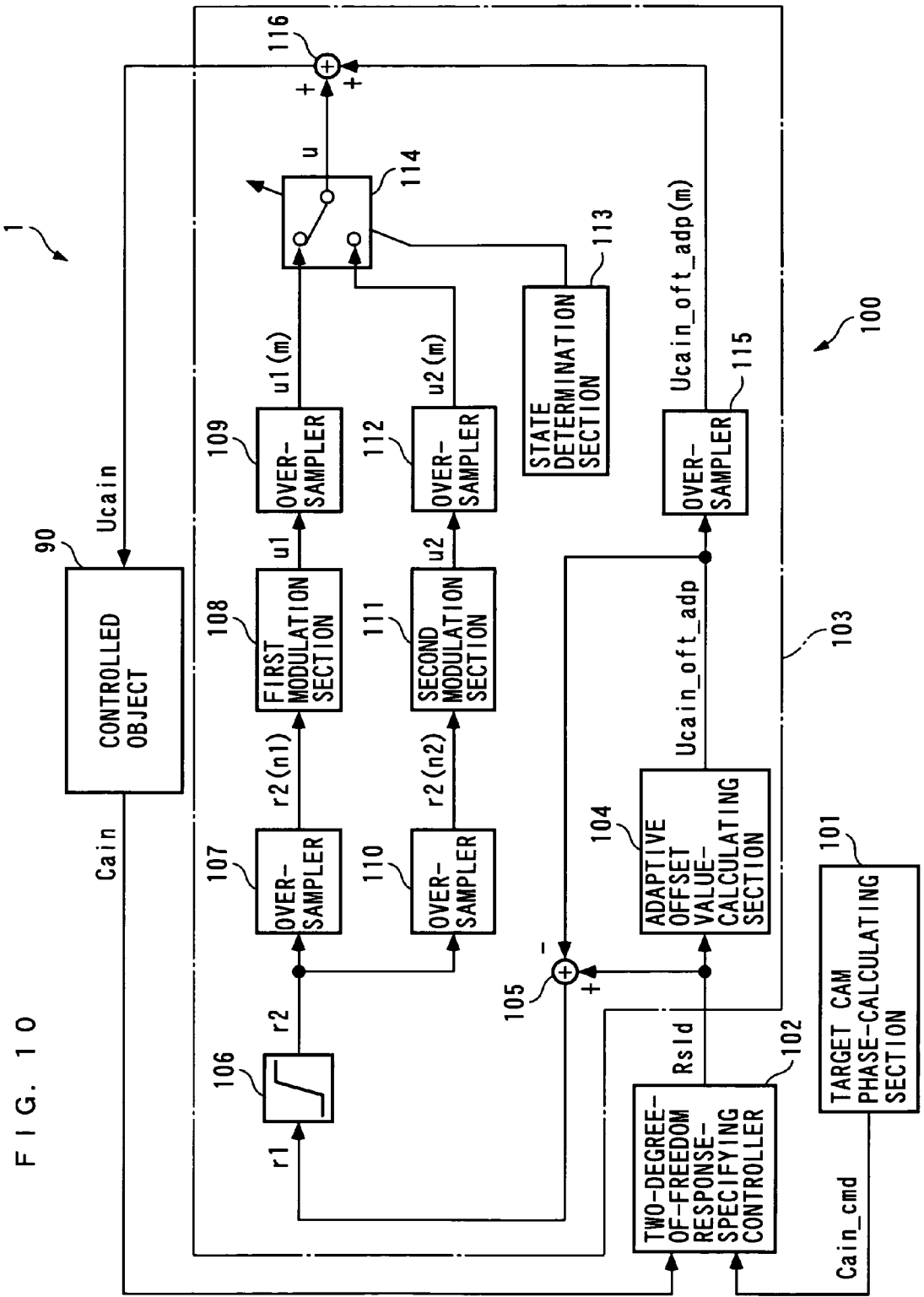
FIG. 10 is a schematic block diagram of a cam phase controller.

As shown in FIG. 10. the cam phase controller 100 is comprised of a target cam phase-calculating section 101, a two-degree-of-freedom response-specifying controller 102, and a DSM controller 103.

The target cam phase-calculating section 101 calculates, as described hereinafter, the target cam phase Cain_cmd e.g. by searching a map (see FIG. 15) according to operating conditions of the engine 3. It should be noted that in the present embodiment, the target cam phase-calculating section 101 corresponds to the target value-setting means, and the target cam phase Cain_cmd corresponds to the target value.

The two-degree-of-freedom response-specifying controller 102 calculates the follow-up control input Rsld for cam phase control with a target value filter-type two-degree-of-freedom sliding mode control algorithm expressed by the following equations (1) to (9) as a value for causing the cam phase Cain to follow the target cam phase Cain_cmd. It should be noted that the two-degree-of-freedom response-specifying controller 102 corresponds to the follow-up control input-calculating means.

$$\text{Cain\_cmd\_f}(k) = -\text{POLE\_f} \cdot \text{Cain\_cmd\_f}(k-1) + (1+\text{POLE\_f})\text{Cain\_cmd}(k) \quad (1)$$

$$Rsld(k) = Req(k) + Rrch(k) + Radp(k) + Rdamp(k) \quad (2)$$

$$Req(k) = \frac{1}{b1}\{(1 - a1 - \text{POLE}) \cdot \text{Cain}(k) + (\text{POLE} - a2) \cdot \text{Cain}(k-1) - b2 \cdot Rsld'(k-1) + \text{Cain\_cmd\_f}(k) + (\text{POLE} - 1) \cdot \text{Cain\_cmd\_f}(k-1) - \text{POLE} \cdot \text{Cain\_cmd\_f}(k-2)\} \quad (3)$$

$$Rsld'(k-1) = r2(k-1) + Ucain\_oft\_adp(k-1) \quad (4)$$

$$Rrch(k) = \frac{-Krch}{b1} \cdot \sigma s(k) \quad (5)$$

$$Radp(k) = \frac{-Kadp}{b1} \cdot \sum_{i=0}^{k} \sigma s(i) \quad (6)$$

$$Rdamp(k) = -Kdamp \cdot \{\text{Cain}(k) - \text{Cain}(k-1)\} \quad (7)$$

$$\sigma s(k) = e(k) + \text{POLE} \cdot e(k-1) \quad (8)$$

$$e(k) = \text{Cain}(k) - \text{Cain\_cmd\_f}(k-1) \quad (9)$$

In the above equations (1) to (9), discrete data with a symbol (k) indicates that it is data sampled or calculated in synchronism with a predetermined control period $\Delta Tk$ ($8 \cdot \Delta Tu$, i.e. the eightfold value of a predetermined control period $\Delta Tu$, referred to hereinafter). The symbol k indicates a position in the sequence of sampling cycles of respective discrete data. For example, the symbol k indicates that discrete data therewith is a value sampled in the current control timing, and a symbol k−1 indicates that discrete data therewith is a value sampled in the immediately preceding control timing. This also applies to the following discrete data. It should be noted that in the following description, the symbol (k) provided for the discrete data are omitted as deemed appropriate.

In the control algorithm, first, a filtered value Cain_cmd_f of a target cam phase is calculated with a first-order lag filter algorithm expressed by the equation (1). In the equation (1), POLE_f represents a target value filter-setting parameter set to a value which satisfies the relationship of −1<POLE_f<0.

Next, the follow-up control input Rsld for cam phase control is calculated with a sliding mode control algorithm expressed by the equations (2) to (9). That is, as shown in the equation (2), the follow-up control input Rsld for cam phase control is calculated as the sum of an equivalent control input Req, a reaching law input Rrch, an adaptive law input Radp, and a damping input Rdamp.

The equivalent control input Req is calculated using the equation (3). In the equation (3), parameters a1, a2, b1, and b2 represent model parameters of a model, referred to hereinafter, which are set to respective predetermined values. Further, in the equation (3), POLE represents a switching function-setting parameter set to a value which satisfies the relationship of −1<POLE_f<POLE<0. Further, Rsld' in the equation (3) represents the immediately preceding equivalent value of the follow-up control input calculated by the equation (4). In the equation (4), r2 represents a limited value calculated by the limiter 106, as described hereinbelow, and Ucain_oft_adp represents an adaptive offset value which is calculated by the adaptive offset value-calculating section 104, as described hereinafter.

Further, the reaching law input Rrch is calculated using an equation (5). In the equation (5), Krch represents a predetermined reaching law gain, and σs represents a switching function defined by the equation (8). The symbol e in the equation (8) represents a difference defined by the equation (9).

Furthermore, the adaptive law input Radp is calculated by the equation (6). In the equation (6), Kadp represents a predetermined adaptive law gain. In the meantime, the damping input Rdamp is calculated by the equation (7). In the equation (7), Kdamp represents a predetermined damping gain.

The equations (1) to (9) are derived as follows: When the controlled object is defined as a system to which the follow-up control input Rsld for the cam phase control is input as a control input, to thereby control the cam phase Cain as a controlled variable, and this system is modeled into a discrete-time system model, the following equation (10) is obtained:

$$\text{Cain}(k+1) = a1 \cdot \text{Cain}(k) + a2 \cdot \text{Cain}(k-1) + b1 \cdot Rsld(k) + b2 \cdot Rsld(k-1) \quad (10)$$

To the controlled object modeled as described above, the target filter-type two-degree-of-freedom sliding mode control theory is applied such that the cam phase Cain follows the target cam phase Cain_cmd, and at the same time, the immediately preceding value Rsld' (k−1) of the above-mentioned follow-up control input on the right side of the equation of the equivalent input Req is replaced by the immediately preceding equivalent value Rsld' (k−1) of the above-mentioned follow-up control input, whereby the aforementioned equations (1) to (9) are derived.

The reason for using the immediately preceding value Rsld(k−1) of the above-mentioned follow-up control input in place of the immediately preceding equivalent value Rsld' (k−1) of the same is as follows: The phase control input Ucain inputted to the controlled object 90 is calculated by subjecting the difference between the follow-up control input Rsld and the adaptive offset value Ucain_oft_adp to a limiting process to thereby calculate the limited value r2, and subjecting the limited value r2 to an oversampling process, a modulation process, again an oversampling process, and/or the like to calculate a modulated value u, and adding the adaptive offset value Ucain_oft_adp to the modulated value u.

In contrast, to properly maintain the characteristics of the equivalent input Req for holding the value of the switching function as that acts as a feedforward input, on a switching straight line, it is necessary, in the calculation of the equivalent input Req, to enhance the accuracy of calculation of the control input by using the real value of the follow-up control input Rsld before the modulation contained in the phase control input Ucain(k−1) actually input to the controlled object 90 in the immediately preceding control timing, as the immediately preceding value of the follow-up control input Rsld. In this case, in the calculation of the phase control input Ucain, the follow-up control input Rsld, the limited value r2 obtained by subjecting the difference between the follow-up control input Rsld and the adaptive offset value Ucain_oft_adp to the limit process, as described above, and hence, the sum of the limited value r2(k−1) and the adaptive offset value Ucain_oft_adp(k−1), i.e. the immediately preceding equivalent value Rsld' (k−1) corresponds to the real value of the follow-up control input Rsld before the modulation contained in the phase control input Ucain(k−1) calculated in the immediately preceding control timing. For the above reason, in the algorithm of the two-degree-of-freedom response-specifying controller 102, the immediately preceding equivalent value Rsld' (k−1) is used in place of the immediately preceding value Rsld(k−1) of the follow-up control input.

Next, a description will be given of the DSM controller 103. The DSM controller 103 calculates the phase control input Ucain based on the follow-up control input Rsld, as described hereafter, and is comprised of an adaptive offset value-calculating section 104, a subtractor 105, a limiter 106, five oversamplers 107, 109, 110, 112, and 115, a first modulation section 108, a second modulation section 111, a state determination section 113, a modulated value-selecting section 114, and an adder 116, as shown in FIG. 10. It should be noted that in the present embodiment, the DSM controller 103 corresponds to the control input-calculating means.

The adaptive offset value-calculating section 104 calculates the adaptive offset value Ucain_oft_adp based on the follow-up control input Rsld with an algorithm described hereinafter.

First, an unprocessed value Ucain_oft_adp' of the adaptive offset value is calculated with a rate-limiting process algorithm expressed by the following equations (11) to (15):

$$Ucain\_oft\_adp'(k) = Ucain\_oft\_adp(k-1) + Ducain\_mod(k) \quad (11)$$

WHEN Eps≦Ducain(k), $$Ducain\_mod(k) = Eps \quad (12)$$

WHEN −Eps(k)<Ducain(k)<Eps, $$Ducain\_mod(k) = Ducain(k) \quad (13)$$

WHEN Ducain(k)≦−Eps, $$Ducain\_mod(k) = -Eps \quad (14)$$

$$Ducain(k) = Rsld(k) - Ucain\_oft\_adp(k-1) \quad (15)$$

In the equation (11), Ducain_mod represents an amount of change in the unprocessed value Ucain_oft_adp', and as shown in the equations (12) to (15), is calculated by subjecting the difference Ducain between the present value of the follow-up control input Rsld and the immediately preceding value of the adaptive offset value Ucain_oft_adp to a limiting process using Eps as an upper limit value and −Eps as a lower limit value. It should be noted that the value Eps is set to a predetermined positive value. The unprocessed value Ucain_oft_adp' of the adaptive offset value is calculated as described above, and hence it is calculated as a value gently following a change in the follow-up control input Rsld.

Next, the adaptive offset value Ucain_oft_adp is calculated by subjecting the unprocessed value Ucain_oft_adp' of the adaptive offset value to the limiting process shown in the following equations (16) to (19):

$$Ucain\_oft\_adp(k) = Lim(Ucain\_oft\_adp'(k)) \quad (16)$$

WHEN Ucain_oft_max≦Ucain_oft_adp'(k), $$Lim(Ucain\_oft\_adp'(k)) = Ucain\_oft\_max \quad (17)$$

WHEN Ucain_oft_min<Ucain_oft_adp'(k)<Ucain_oft max, $$Lim(Ucain\_oft\_adp'(k)) = Ucain\_oft\_adp'(k) \quad (18)$$

WHEN Ucain_oft_adp'(k)=Ucain_oft_min, $$Lim(Ucain\_oft\_adp'(k)) = Ucain\_oft\_min \quad (19)$$

In the equation (16), Lim(Ucain_oft_adp') represents a limiting function, and the value is defined as in the equations (17) to (19). Further, Ucain_oft_max in the equation (17) represents a predetermined upper limit value, and Ucain_oft_min in the equation (19) represents a predetermined lower limit value. As described above, the adaptive offset value Ucain_oft_adp is calculated by subjecting the unprocessed value Ucain_oft_adp' to the limiting process, as a value which exceeds neither the upper limit values Ucain_oft max nor the lower limit value Ucain_oft_min. This makes it possible to prevent the final modulated phase control input Ucain from exceeding the upper or lower limit of the range (e.g. 0 to 12 V) that can be attained by hardware, to thereby prevent the control from becoming impossible to execute.

Further, the subtractor 105 calculates the reference input r1 as the difference between the follow-up control input Rsld and the adaptive offset value Ucain_oft_adp, as shown in the equation (20). It should be noted that in the present embodiment, the reference input r1 corresponds to one input component, and the adaptive offset value Ucain_oft_adp to an input component other than the one input component.

$$r1(k) = Rsld(k) - Ucain\_oft\_adp(k) \quad (20)$$

Then, the limiter 106 calculates the limited value r2 by subjecting the reference input r1 to a limiting process expressed by the following equations (21) to (24):

$$r2(k) = Lim(r1(k)) \quad (21)$$

WHEN r1_max≦r1(k), $$Lim(r1(k)) = r1\_max \quad (22)$$

WHEN r1_min<r1(k)<r1_{max}, $$Lim(r1(k)) = r1(k) \quad (23)$$

WHEN r1(k)≦r1_min, $$Lim(r1(k)) = r1\_min \quad (24)$$

In the equation (21), Lim(r1) represents a limiting function, and the value is defined as shown in equations (22) to (24). The symbol r1_max in this equation (22) represents a predetermined upper limit value, and r1_min represents a predetermined lower limit value.

Further, the oversampler 107 calculates the oversampled value r2(n1) by oversampling the limited value r2 at a predetermined control period ΔT1 (=4·Δ Tu). It should be noted that in the following description, discrete data with a symbol (n1) indicates that it is data sampled or calculated in synchronism with a predetermined control period ΔT1. Further, in the following description, the symbol (n1) is omitted as deemed appropriate.

Further, the first modulation section 108 calculates the first modulated value u1 by modulating the oversampled value r2(n1) of the limited value with a modulation algorithm which is based on the ΔΣ modulation algorithm and expressed by the following equations (25) to (29):

$$\delta 1(n1)=r2(n1)-u1(n1-1) \quad (25)$$

$$\sigma 1(n1)=\sigma 1(n1-1)+\delta 1(n1) \quad (26)$$

$$u1(n1)=fnl(\sigma 1(n1)) \quad (27)$$

WHEN $\sigma 1(n1) \geq 0$, $$fnl(\sigma 1(n1))=R1 \quad (28)$$

WHEN $\sigma 1(n1)<0$, $$fnl(\sigma 1(n1))=-R1 \quad (29)$$

As shown in the equation (25), the difference 61 is calculated as the difference between the present value of the oversampled value r2 of the limited value and the immediately preceding value of the first modulated value u1. Further, in the equation (26), σ1 represents an integral value of the difference δ1. Further, in the equation (27), fnl(σ1) represents a nonlinear function whose value is defined as in the equations (28) and (29) (it may be defined that when σ1=0, fnl(a1)=0 holds.)

Further, R1 in the equations (28) and (29) is set to such a predetermined positive value as will always satisfy the relationship of R1>|r2|, and make the amplitude 2·R1 of the first modulated value u1 smaller than a range between the maximum value and the minimum value which the follow-up control input Rsld can assume during the control. It should be noted that the value R1 may be calculated by searching a table or a map according to operating conditions of the engine 3. As is clear from the equations (25) to (29), the first modulated value u1 is calculated as a value which is repeatedly inverted between a predetermined value −R1 and a predetermined value R1.

Next, the oversampler 109 calculates an oversampled value u1(m) of the first modulated value by oversampling the first modulated value u1 at the predetermined control period ΔTu. It should be noted that discrete data with a symbol (m) indicates that it is data sampled or calculated in synchronism with the predetermined control period ATu. Further, in the following description, the symbol (m) is omitted as deemed appropriate.

On the other hand, the oversampler 110 calculates the oversampled value r2(n2) of the limited value by oversampling the limited value r2 at a predetermined control period ΔT2 (=2·ΔTu). It should be noted that discrete data with a symbol (n2) indicates that it is data sampled or calculated in synchronism with a predetermined control period ΔT2. Further, in the following description, the symbol (n2) is omitted as deemed appropriate.

Further, the second modulation section 111 calculates the second modulated value u2 by modulating the oversampled value r2(n2) of the limited value with a modulation algorithm which is based on the ΔΣ modulation algorithm and expressed by the following equations (30) to (34):

$$\delta 2(n2)=r2(n2)-u2(n2-1) \quad (30)$$

$$\sigma 2(n2)=\sigma 2(n2-1)+\delta 2(n2) \quad (31)$$

$$u2(n2)=fnl(\sigma 2(n2)) \quad (32)$$

WHEN $\sigma 2(n2) \geq 0$, $$fnl(\sigma 2(n2))=R2 \quad (33)$$

WHEN $\sigma 1(n2)<0$, $$fnl(a2(n2))=-R2 \quad (34)$$

As shown in the equation (30), the difference 62 is calculated as the difference between the present value of the oversampled value r2 of the limited value and the immediately preceding value of the second modulated value u2. Further, in the equation (31), u2 represents an integral value of the difference σ2. Also, in the equation (32), fnl(σ2) represents a nonlinear function as defined in the equations (33) and (34) (it may be defined that when σ2=0, fn1(u2)=0 holds).

Further, R2 in the equations (33) and (34) is set to such a predetermined positive value as will always satisfy the relationship of R2>|r2| during the control and make the amplitude 2·R2 of the second modulated value u2 smaller than a range between the maximum value and the minimum value which the follow-up control input Rsld can assume during the control. It should be noted that the value R2 may be calculated by searching a table or a map according to operating conditions of the engine 3. As is clear from the equations (30) to (34), the second modulated value u2 is calculated as a value which is repeatedly inverted between a predetermined value −R2 and a predetermined value R2.

Next, the oversampler 112 calculates the oversampled value u2(m) by oversampling the second modulated value u2 at the predetermined control period ΔTu.

Further, the state determination section 113 sets a modulated value selection flag F_DSMFRQ to 1 or 0 by searching maps (see FIGS. 16 to 18) according to the engine speed NE, the valve lift Liftin, and the cam phase Cain, respectively. It should be noted that in the present embodiment, the engine speed NE, the valve lift Liftin, and the cam phase Cain each correspond to a parameter indicative of a state of the controlled object.

Next, the modulated value-selecting section 114 calculates the modulated value u by the following equations (35) and (36) according to the modulated value selection flag F_DSMFRQ set by the state determination section 113. That is, one of the first modulated value u1 and the second modulated value u2 is selected as the modulated value u.

WHEN F_DSMFRQ=1, $$u(m)=u1(m) \quad (35)$$

WHEN F_DSMFRQ=0, $$u(m)=u2(m) \quad (36)$$

On the other hand, the oversampler 115 calculates the oversampled value Ucain_oft_adp(m) of the adaptive offset value by oversampling the adaptive offset value Ucain_oft_adp calculated by the adaptive offset value-calculating section 104 at the predetermined control period ΔTu.

Next, the adder 116 calculates the phase control input Ucain by the following equation (37):

$$Ucain(m)=u(m)+Ucain\_oft\_adp(m) \quad (37)$$

Next, the aforementioned valve lift controller 200 will be explained with reference to FIG. 11. The valve lift controller 200 controls the valve lift Liftin as the controlled variable by inputting the lift control input Uliftin to the controlled object 190. More specifically, the controlled object 190 corresponds to a system including the variable valve lift mechanism 50.

The valve lift controller 200 calculates the lift control input Uliftin by the same computation method as employed by the cam phase controller 100, as described hereinbelow, and the lift control input Uliftin is input to the controlled object 190 whereby the valve lift Liftin is controlled such that it follows the target valve lift Liftin_cmd.

Figure 11:
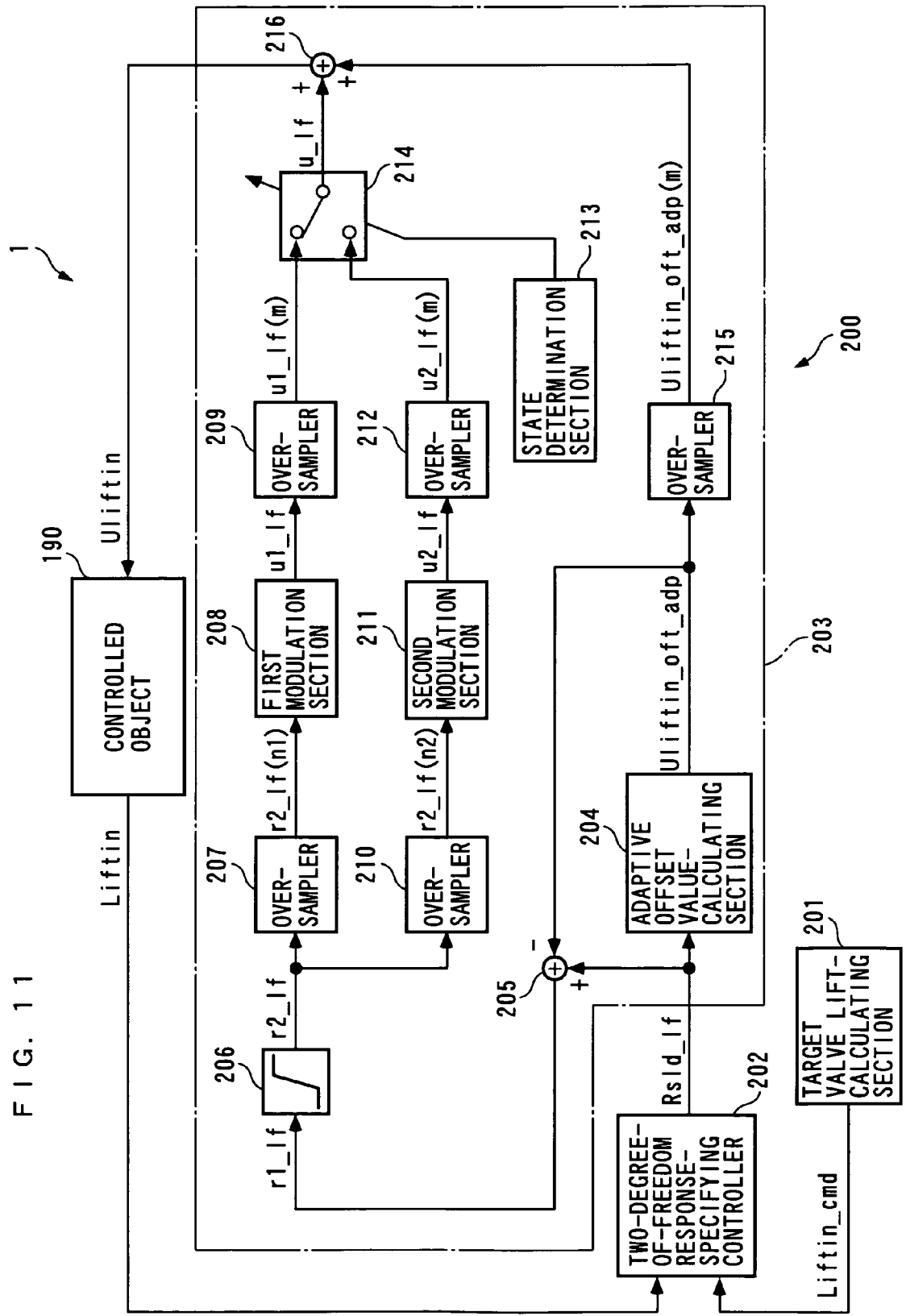
FIG. 11 is a schematic block diagram of a valve lift controller.

As shown in FIG. 11, the valve lift controller 200 is comprised of a target valve lift-calculating section 201, a two-degree-of-freedom response-specifying controller 202, and a DSM controller 230.

The target valve lift-calculating section 201 calculates the target valve lift Liftin_cmd, as described hereinafter, by searching a map (see FIG. 21), according to operating conditions of the engine 3. It should be noted that in the present embodiment, the target valve lift-calculating section 201 corresponds to the target value-setting means, and the target valve lift Liftin_cmd to the target value.

The two-degree-of-freedom response-specifying controller 202 calculates the follow-up control input Rsld_lf for valve lift control, with a target value filter-type two-degree-of-freedom sliding mode control algorithm which is expressed by the following equations (38) to (41), as a value for causing the valve lift Liftin to follow the target valve lift Liftin_cmd. It should be noted in the present embodiment, the two-degree-of-freedom response-specifying controller 202 corresponds to the follow-up control input-calculating means.

$$Liftin\_cmd\_f(k) = -POLE\_f\_lf \cdot Liftin\_cmd\_f(k-1) + (1+POLE\_f\_lf) \cdot Liftin\_cmd(k) \quad (38)$$

$$Rsld\_lf(k) = Req\_lf(k) + Rrch\_lf(k) + Radp\_lf(k) + Rdamp\_lf(k) \quad (39)$$

$$Req\_lf(k) = \frac{1}{b1\_lf}\{(1-a1\_lf-POLE\_lf) \cdot Liftin(k) + (POLE\_lf - a2\_lf) \cdot Liftin(k-1) - b2\_lf \cdot Rsld\_lf'(k-1) + Liftin\_cmd\_f(k) + (POLE\_lf-1) \cdot Liftin\_cmd\_f(k-1) - POLE\_lf \cdot Liftin\_cmd\_f(k-2)\} \quad (40)$$

$$Rsld\_lf'(k-1) = r2\_lf(k-1) + Uliftin\_oft\_adp(k-1) \quad (41)$$

$$Rrch\_lf(k) = \frac{-Krch\_lf}{b1\_lf} \cdot \sigma s\_lf(k) \quad (42)$$

$$Radp\_lf(k) = \frac{-Kadp\_lf}{b1\_lf} \cdot \sum_{i=0}^{k} \sigma s\_lf(i) \quad (43)$$

$$Rdamp\_lf(k) = -Kdamp\_lf\{Liftin(k)-Liftin(k-1)\} \quad (44)$$

$$\sigma s\_lf(k) = e\_lf(k) + POLE\_lf \cdot e\_lf(k-1) \quad (45)$$

$$e\_lf(k) = Liftin(k) - Liftin\_cmd\_f(k-1) \quad (46)$$

In the control algorithms described above, first, the filtered value Liftin_cmd_f of the target valve lift is calculated with a first-order lag filter algorithm shown in the equation (38). In the equation (38), POLE_f_lf represents a target value filter-setting parameter, and is set to a value which satisfies the relationship of $-1 < POLE\_f\_lf < 0$.

Next, with the sliding mode control algorithm expressed by the equations (39) to (46), the follow-up control input Rsld_lf for the valve lift control is calculated. More specifically, as shown in the equation (39), the follow-up control input Rsld_lf for the valve lift control is calculated as the total sum of the equivalent input Req_lf, the reaching law input Rrch_lf, the adpative low input Radp_lf, and the damping input Rdamp_lf.

The equivalent input Req_lf is calculated by the equation (40). In the equation (40), a1_lf, a2_lf, b1_lf, and b2_lf represents model parameters of a model, referred to hereinafter, and these parameters are set to respective predetermined values. Further, in the equation (40), POLE_lf represents a switching function-setting parameter, and is set to a value which satisfies the relationship of $-1 < POLE\_f\_lf < POLE\_lf < 0$. Further, Rsld_lf' in the equation (40) represents the immediately preceding equivalent value of the follow-up control input calculated by the equation (41). In the equation (41), r2_lf represents a limited value calculated by the limiter 206 as described hereinbelow, while Uliftin_oft_adp represents an offset value calculated by the adaptive offset value-calculating section 204 set as described hereinbelow.

Further, the reaching law input Rrch_lf is calculated by the equation (42). In this equation (42), Krch_lf represents a predetermined reaching law gain, and σ s_lf represents a switching function defined by the equation (45). The symbol e_lf in the equation (45) represents a difference as defined by the equation (46).

Further, the adaptive law input Radp_lf is calculated by the equation (43). In this equation (43), Kadp_lf represents a predetermined adaptive law gain, while the damping input Rdamp_lf is calculated by the equation (44). The symbol Kdamp_lf in the equation (44) represents a predetermined damping gain.

It should be noted that the above equations (38) to (46) are derived as follows: When the controlled object is defined as a system to which is input the follow-up control input Rsld_lf for the valve lift control, as the control input, to thereby control the valve lift Liftin as a controlled variable, and the system is modeled into a discrete-time system model, the following equation (47) is obtained.

$$Liftin(k+1) = a1\_lf \cdot Liftin(k) + a2\_lf \cdot Liftin(k-1) + b1\_lf \cdot Rsld\_lf(k) + b2\_lf \cdot Rsld\_lf(k-1) \quad (47)$$

To the controlled object modeled as described above, the target filter-type two-degree-of-freedom sliding mode control theory is applied such that the valve lift Liftin follows the target valve lift Liftin_cmd, and at the same time, for the same reason as the above-described reason for using the immediately preceding equivalent value Rsld', the immediately preceding value Rsld_lf(k−1) of the follow-up control input on the right side of the equation of the equivalent input Req_lf is replaced by the immediately preceding equivalent value Rsld_lf' (k−1) of the above-mentioned follow-up control input, whereby the aforementioned equations (38) to (46) are derived.

Next, a description will be given of the DSM controller 203. The DSM controller 203 calculates the lift control input Uliftin based on the follow-up control input Rsld_lf, as described hereafter. Referring to FIG. 11, the DSM controller 203 is comprised of an adaptive offset value-calculating section 204, a subtractor 205, a limiter 206, five oversamplers 207, 209, 210, 212, and 215, a first modulation section 208, a second modulation section 211, a state determination section 213, a modulated value-selecting section 214, and an adder 216. It should be noted that in the present embodiment, the DSM controller 203 corresponds to the control input-calculating means.

The adaptive offset value-calculating section 204 calculates the adaptive offset value Uliftin_oft_adp based on the follow-up control input Rsld_lf with an algorithm described hereinafter.

First, an unprocessed value Uliftin_oft_adp' of the adaptive offset value is calculated with a rate-limiting process algorithm expressed by the following equations (48) to (52):

$$Uliftin\_oft\_adp'(k)=Uliftin\_oft\_adp(k-1)+Duliftin\_mod(k) \quad (48)$$

WHEN Eps_lf≦Duliftin(k), $$Duliftin\_mod(k)=Eps\_lf \quad (49)$$

WHEN −Eps_lf(k)<Duliftin(k)<Eps_lf, $$Duliftin\_mod(k)=Duliftin(k) \quad (50)$$

WHEN Duliftin(k)≦−Eps_lf, $$Duliftin\_mod(k)=-Eps\_lf \quad (51)$$

$$Duliftin(k)=Rsld\_lf(k)-Uliftin\_oft\_adp(k-1) \quad (52)$$

In the equation (48), Duliftin_mod represents an amount of change in the unprocessed value Uliftin_oft_adp', and as shown in the equations (49) to (52), is calculated by subjecting the difference Duliftin between the present value of the follow-up control input Rsld_lf and the immediately preceding value of the adaptive offset value Uliftin_oft_adp to a limiting process using Eps_lf as an upper limit value and −Eps_lf as a lower limit value. It should be noted that the value Eps_lf is set to a predetermined positive value.

Next, the adaptive offset value Uliftin_oft_adp is calculated by subjecting the unprocessed value Uliftin_oft_adp' thus calculated to a limiting process shown in the following equations (53) to (56):

$$Uliftin\_oft\_adp(k)=Lim(Uliftin\_oft\_adp'(k)) \quad (53)$$

WHEN Uliftin_oft_max≦Uliftin_oft_adp'(k), $$Lim(Uliftin\_oft\_adp'(k))=Uliftin\_oft\_max \quad (54)$$

WHEN Uliftin_oft_min<Uliftin_oft adp'(k)<Uliftin_oft_max, $$Lim(Uliftin\_oft\_adp'(k))=Uliftin\_oft\_adp'(k) \quad (55)$$

WHEN Uliftin_oft_adp'(k)≦Uliftin_oft_min, $$Lim(Uliftin\_oft\_adp'(k))=Uliftin\_oft\_min \quad (56)$$

In the equation (53), Lim(Uliftin_oft_adp') represents a limiting function, and the value thereof is defined as in the equations (54) to (56). Further, Uliftin_oft_max in the equation (54) represents a predetermined upper limit value, and Uliftin_oft_min in the equation (56) represents a predetermined lower limit value. As described above, the adaptive offset value Uliftin_oft_adp is calculated by subjecting the unprocessed value Uliftin_oft_adp' to the limiting process. Therefore, the adaptive offset value Uliftin_oft_adp is calculated as a value which gently follows a change in the follow-up control input Rsld_lf, and exceeds neither the upper limit value Uliftin_oft_max nor the lower limit value Uliftin_oft_min.

Further, the subtractor 205 calculates the reference input r1_lf as the difference between the follow-up control input Rsld_lf and the adaptive offset value Uliftin_oft_adp, as shown in the equation (57). It should be noted that in the present embodiment, the reference input r1_lf corresponds to one input component, and the adaptive offset value Uliftin_oft_adp to an input component other than the one input component.

$$r1\_lf(k)=Rsld\_lf(k)-Uliftin\_oft\_adp(k) \quad (57)$$

Then, the limiter 206 calculates the limited value r2_lf by subjecting the reference input r1_lf to a limiting process as shown in the following equations (58) to (61):

$$r2\_lf(k)=Lim(r1\_lf(k)) \quad (58)$$

WHEN r1_lf_max≦r1_lf(k), $$Lim(r1\_lf(k))=r1\_lf\_max \quad (59)$$

WHEN r1_lf_min<r1_lf(k)<r1_lf_max, $$Lim(r1\_lf(k))=r1\_lf(k) \quad (66)$$

WHEN r1_lf(k)≦r1_lf_min, $$Lim(r1\_lf(k))=r1\_lf\_min \quad (61)$$

In the equation (58), Lim(r1_lf) represents a limiting function, and the value thereof is defined as shown in equations (59) to (61). The symbol r1_lf_max in the equation (59) represents a predetermined upper limit value, and r1_lf_min in the equation (61) represents a predetermined lower limit value.

Further, the oversampler 207 calculates the oversampled value r2_lf(n1) of the limited value r2_lf by oversampling the limited value r2_lf at a predetermined control period ΔT1.

Further, the first modulation section 208 calculates the first modulated value u1_lf by modulating the oversampled value r2_lf(n1) of the limited value with a modulation algorithm which is based on the Δ Σ modulation algorithm and expressed by the following equations (62) to (66):

$$\delta1\_lf(n1)=r2\_lf(n1)-u1\_lf(n1-1) \quad (62)$$

$$\sigma1\_lf(n1)=\sigma1\_lf(n1-1)+\delta1\_lf(n1) \quad (63)$$

$$u1\_lf(n1)=fnl(\sigma1\_lf(n1)) \quad (64)$$

WHEN σ1_lf(n1)≧0, $$fnl(\sigma1\_f(n1))=R1\_lf \quad (65)$$

WHEN σ1_lf(n1)<0, $$fnl(\sigma1\_lf(n1))=-R1\_lf \quad (66)$$

As shown in the equation (62), the difference δ1_lf is calculated as the difference between the present value of the oversampled value r2_lf of the limited value and the immediately preceding value of the first modulated value u1_lf. Further, in the equation (63), ν1_lf represents an integral value of the difference δ1_lf. Further, in the equation (64), fnl(σ1_lf) represents a nonlinear function whose value is defined as in the equations (65) and (66) (it may be defined that when σ1_lf=0, fnl(σ1_lf)=0 holds.)

Further, R1_lf in the equations (65) and (66) is set to such a predetermined positive value as will always satisfy the relationship of R1_lf>|r2_lf|, and make the amplitude 2·R1_lf of the first modulated value u1_lf smaller than a range between the maximum value and the minimum value which the follow-up control input Rsld_lf can assume during the control. It should be noted that the value R1_lf may be calculated by searching a table or a map according to operating conditions of the engine 3. As is clear from the equations (62) to (66), the first modulated value u1_lf is calculated as a value which is repeatedly inverted between a predetermined value −R1_lf and a predetermined value R1_lf.

Next, the oversampler 209 calculates an oversampled value u1_lf(m) of the first modulated value by oversampling the first modulated value u1_lf at the predetermined control period ΔT2.

On the other hand, the oversampler 210 calculates an oversampled value r2_lf(n2) of the limited r2_lf value by oversampling the limited value r2_lf at the predetermined control period ΔT2.

Further, the second modulation section 211 calculates the second modulated value u2_lf by modulating the oversampled value r2_lf(n2) of the limited value with a modulation algorithm which is based on the Δ Σ modulation algorithm and expressed by the following equations (67) to (71):

$$\delta2\_lf(n2)=r2\_lf(n2)-u2\_lf(n2-1) \tag{67}$$

$$\sigma2\_lf(n2)=\sigma2\_lf(n2-1)+\delta2\_lf(n2) \tag{68}$$

$$u2\_lf(n2)=fnl(\sigma2\_lf(n2)) \tag{69}$$

WHEN σ2_*lf*(n2)≧0, $$fnl(\sigma2\_f(n2))=R2\_lf \tag{70}$$

WHEN σ2_lf(n2)<0, $$fnl(\sigma2\_lf(n2))=-R2\_lf \tag{71}$$

As shown in the equation (67), the difference δ2_lf is calculated as the difference between the present value of the oversampled value r2_lf of the limited value and the immediately preceding value of the second modulated value u2_lf. Further, in the equation (68), u2_lf represents an integral value of the difference δ2_lf. Also, in the equation (69), fnl(u2_lf) is a nonlinear function whose value is defined as in the equations (70) and (71) (it may be defined that when u2_lf=0, fnl(u2_lf)=0 holds).

Further, R2_lf in the equations (70) and (71) is set to such a predetermined positive value as will always satisfy the relationship of R2_lf>|r2_lf| during the control and make the amplitude 2·R2_lf of the second modulated value u2_lf smaller than a range between the maximum value and the minimum value which the follow-up control value Rsld_lf can assume during the control. It should be noted that the value R2_lf may be calculated by searching a table or a map according to operating conditions of the engine 3. As is clear from the equations (67) to (71), the second modulated value u2_lf is calculated as a value which is repeatedly inverted between a predetermined value—R2_lf and a predetermined value R2_lf.

Next, the oversampler 212 calculates an oversampled value u2_lf(m) by oversampling the second modulated value u2_lf at the predetermined control period ΔTu.

Further, the state determination section 213 sets a modulated value selection flag F_DSMFRQ_LF to 1 or 0 by searching a map (see FIG. 22) according to the engine speed NE and the valve lift Liftin.

Next, the modulated value-selecting section 214 calculates the modulated value u_lf by the following equations (72) and (73) according to the modulated value selection flag F_DSMFRQ_LF set by the state determination section 213. That is, one of the first modulated value u1_lf and the second modulated value u2_lf is selected as the modulated value u_lf.

WHEN F_DSMFRQ=1, $$u\_lf(m)=u1\_lf(m) \tag{72}$$

WHEN F_DSMFRQ=0, $$u\_lf(m)=u2\_lf(m) \tag{73}$$

On the other hand, the oversampler 215 calculates an oversampled value Uliftin_oft_adp(m) of the adaptive offset value by oversampling the adaptive offset value Uliftin_oft_adp calculated by the adaptive offset value-calculating section 204 at the predetermined control period ΔTu.

Next, the adder 216 calculates the lift control input Uliftin by the following equation (74):

$$Uliftin(m)=u\_lf(m)+Uliftin\_oft\_adp(m) \tag{74}$$

Hereinafter, a process for controlling the cam phase Cain and the valve lift Liftin, which is executed by the ECU 2, will be described with reference to FIG. 12. This process calculates the phase control input Ucain and the lift control input Uliftin, and is executed at the predetermined control period ΔTu (e.g. 1 msec).

Figure 12:
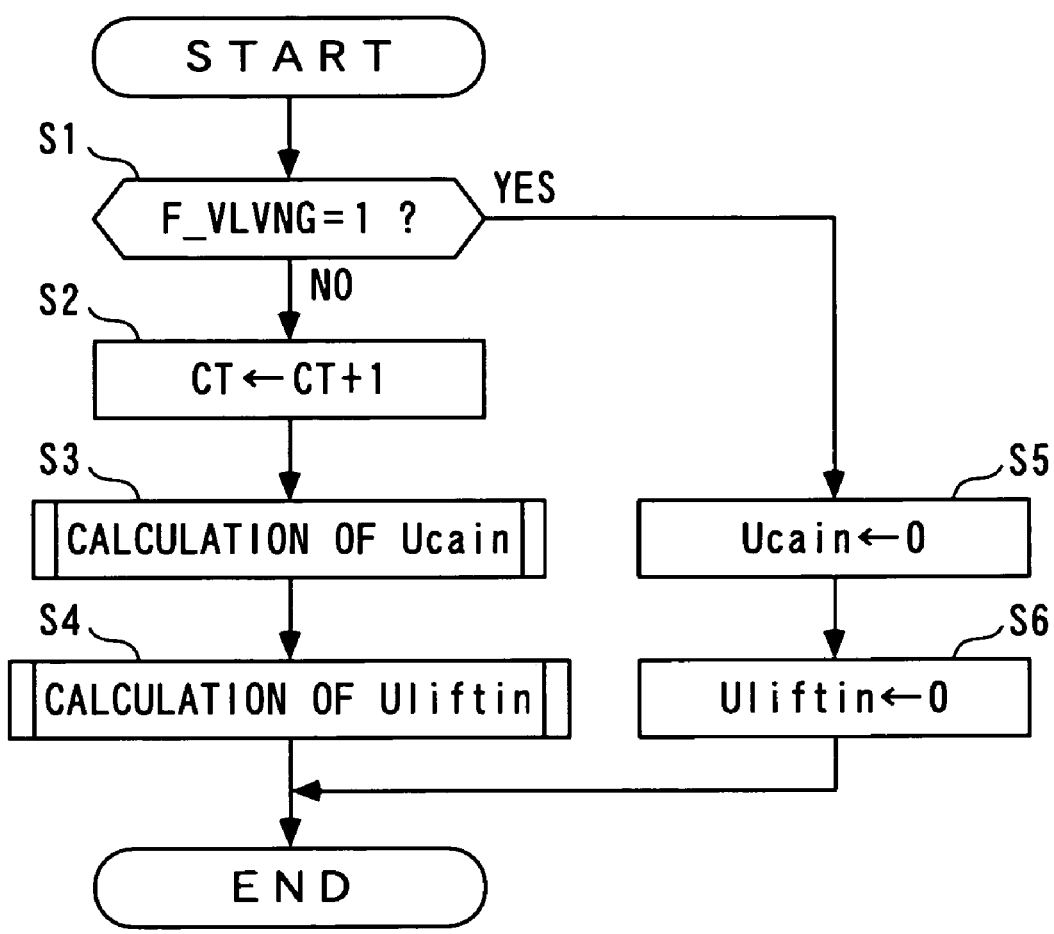
FIG. 12 is a flowchart showing a process for controlling a cam phase and a valve lift.

As shown in FIG. 12, first, in a step 1(shown as S1 in abbreviated form in FIG. 12; the following steps are also shown in abbreviated form), it is determined whether or not an intake valve mechanism failure flag F_VLVNG is equal to 1. The intake valve mechanism failure flag F_VLVNG is set to 1 when the variable intake valve actuating mechanism 40 is faulty, and to 0 when the same is normal.

If the answer to the question of the step 1 is negative (NO), i.e. if the variable intake valve actuating mechanism 40 is normal, the process proceeds to a step 2, wherein a counter value CT is incremented by 1.

Then, in a step 3, the phase control input Ucain is calculated, and then in a step 4, the lift control input Uliftin is calculated, followed by terminating the present process. The processes for calculation of these inputs will be described hereinafter.

On the other hand, if the answer to the question of the step 1 is affirmative (YES), i.e. if the variable intake valve actuating mechanism 40 is faulty, in steps 5 and 6, the phase control input Ucain and the lift control input Uliftin are both set to 0. This causes the cam phase Cain to be held at a predetermined locked value, and the valve lift Liftin is held at the minimum value Liftinmin. As a result, a predetermined failure-time value is secured as the intake air amount, which makes it possible to properly execute idling operation and starting of the engine during stoppage of the vehicle, and maintain low-speed traveling during the traveling of the vehicle. The present process is terminated thereafter.

Figure 13:
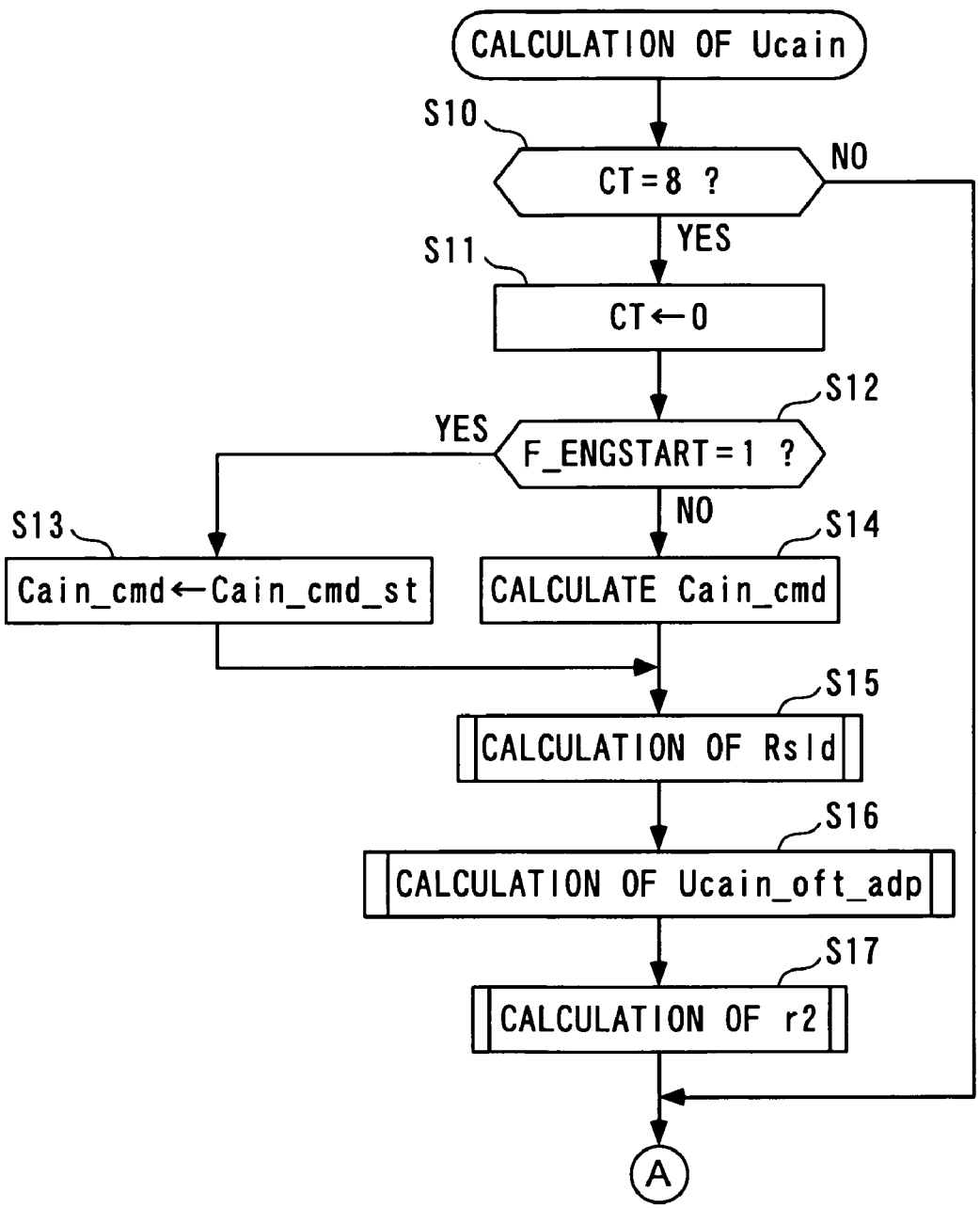
FIG. 13 is a flowchart showing part of a process for calculating a phase control input Ucain.

Next, the process for calculating the phase control input Ucain in the aforementioned step 3 will be described with reference to FIGS. 13 and 14. This process is also executed at the predetermined control period ΔTu.

In this process, first, in a step 10, it is determined whether or not the counter value CT is equal to 8. If the answer to this question is negative (NO), i.e. if CT≠8 holds, the process proceeds to a step 18 in FIG. 14, whereas if the answer to the question is affirmative (YES), i.e. if CT=8 holds, the process proceeds to a step 11, wherein the counter value CT is reset to 0.

Then, the process proceeds to a step 12, wherein it is determined whether or not an engine start flag F_ENGSTART is equal to 1. The engine start flag F_ENGSTART is set by determining, according to the engine speed NE and the output status of the IG·SW 28, whether or not the engine is being started, i.e. during cranking. More specifically, the engine start flag F_ENGSTART is set to 1 during engine start control and otherwise to 0.

If the answer to the question of the step 12 is affirmative (YES), i.e. if the engine is under the engine start control, the process proceeds to a step 13, wherein the target cam phase Cain_cmd is set to a predetermined start value Cain_cmd_st.

Figure 15:
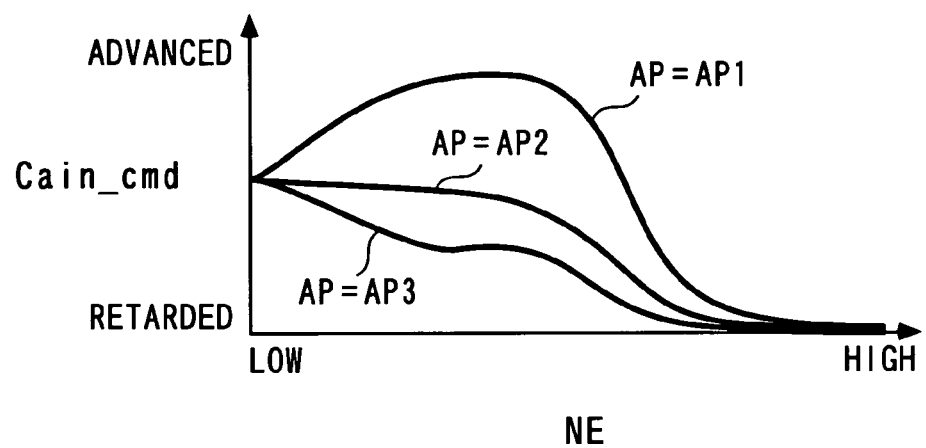
FIG. 15 is a diagram showing an example of a map for use in calculating a target cam phase Cain_cmd.

On the other hand, if the answer to the question of the step 12 is negative (NO), i.e. if the engine 3 has already been started, the process proceeds to a step 14, wherein the target cam phase Cain_cmd is calculated by searching a map shown in FIG. 15 according to the engine speed NE and the accelerator pedal opening AP. In FIG. 15, AP1 to AP3 indicate predetermined values of the accelerator pedal opening AP which satisfy the relationship of AP1<AP2<AP3. This also holds in the following description.

In this map, the target cam phase Cain_cmd is set to a more advanced value when the accelerator pedal opening AP is smaller and the engine is in a medium engine speed region than otherwise. This is because in such an operating condition of the engine 3, it is necessary to increase the internal EGR rate to thereby reduce the pumping loss.

Next, in a step 15, the follow-up control input Rsld is calculated by the aforementioned equations (1) to (9), and the calculated value is stored in the RAM. Thereafter, the process proceeds to a step 16, wherein the adaptive offset value Ucain_oft_adp is calculated by the aforementioned equations (11) to (19), and the calculated value is stored in the RAM.

Then, in a step 17, the limited value r2 is calculated by the aforementioned equations (20) to (24), and the calculated value is stored in the RAM. The above steps 15 to 17 are executed when CT=8 holds, and hence is executed at a control period of 8·ΔTu (=ΔTk).

Figure 14:
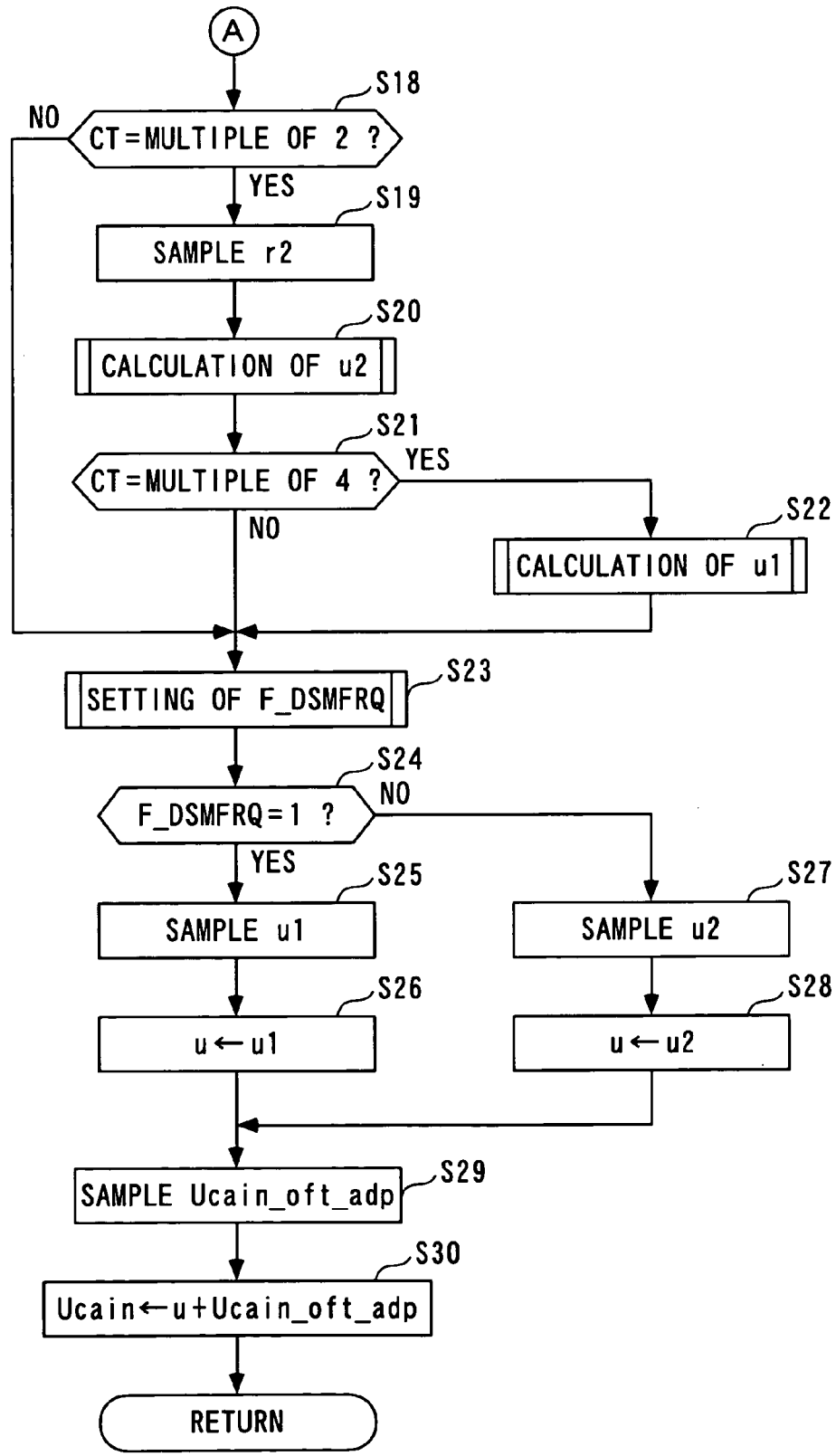
FIG. 14 is a flowchart showing a continuation of FIG. 13.

In a step 18 in FIG. 14 following the step 10 or the step 17, it is determined whether or not the counter value CT is a multiple of 2 (i.e. any of 0, 2, 4, 6, . . . ). If the answer to this questions is negative (NO), the process proceeds to a step 23, referred to hereinafter.

On the other hand, if the answer to the question of the step 18 is affirmative (YES), i.e. if the counter value CT is a multiple of 2, the process proceeds to a step 19, wherein the limited value r2 stored in the RAM is sampled. This step 19 is executed when the counter value CT is a multiple of 2, and hence is executed at a period of 2·ΔTu (=ΔT2) shorter than the period of 8·ΔTu at which the step 17 is executed. Therefore, this corresponds to the oversampling of the limited value r2 to calculate the oversampled value r2(n2).

Then, in a step 20, the second modulated value u2 is calculated by the aforementioned equations (30) to (34).

The process proceed to a step 21, wherein it is determined whether or not the counter value CT is a multiple of 4 (i.e. any of 0, 4, 8, . . . ). If the answer to this question is negative (NO), the process proceeds to a step 23, referred to hereinafter.

On the other hand, if the answer to the question of the step 21 is affirmative (YES), i.e. if the counter value CT is a multiple of 4, the process proceeds to a step 22, wherein the first modulated value u1 is calculated by the aforementioned equations (25) to (29). This step 22 is executed when the counter value CT is a multiple of 4, and hence is executed at a period of 4·ΔTu (=ΔT1) shorter than the operation period or repetition period of 8·ΔTu at which the step 17 is executed. Therefore, this corresponds to the calculation of the first modulated value u1 using the oversampled value r2(n1).

In a step 23 following the step 18, 21, or 22, a modulated value selection flag F_DSMFRQ is set to 1 or 0 by searching a map according to the engine speed NE, the valve lift Liftin, and the cam phase Cain, as described hereinafter.

Figure 16:
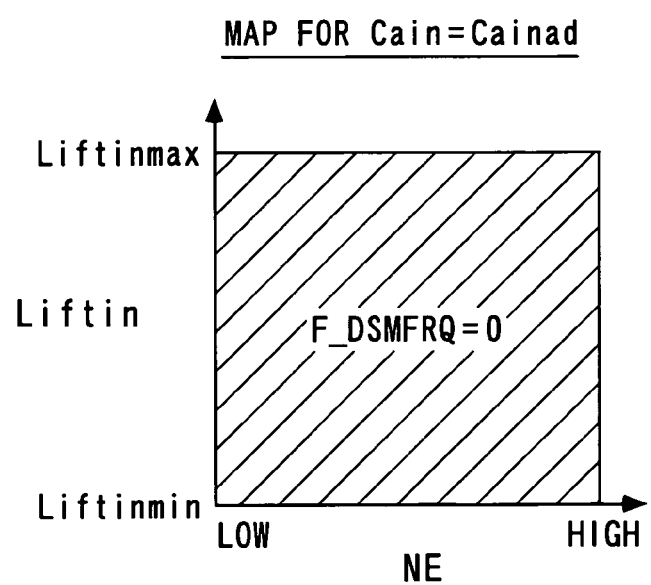
FIG. 16 is a diagram showing an example of a map for Cain=Cainad for use in setting a modulated value selection flag F_DSMFRQ.

In this case, as maps for use in the above steps, there are provided a map for Cain=Cainad shown in FIG. 16, a map for Cain=Cainmi (value corresponding to Cainad/2) shown in FIG. 17, a map for Cain=Cainrt shown in FIG. 18, and a multiplicity of maps (not shown), set in association with multiplicity of values of the cam phase Cain to be assumed when the cam phase Cain is between Cainad and Cainmi and between Cainmi and Cainrt. The modulated value selection flag F_DSMFRQ is set to 1 or 0 by searching one of the maps which is set for a value of the cam phase Cain which is closet to the value actually assumed at the time point.

Referring to FIG. 16, the map for Cain=Cainad shown therein is configured such that F_DSMFRQ=0 holds, in all regions irrespective of the values of the engine speed NE and the valve lift Liftin. This is for the following reason: The valve overlap becomes larger when Cain=Cainad holds than otherwise, and hence the internal EGR rate becomes higher, which increases the combustion variation, causing an increase in the rotational variation of the engine 3. As a result, the sensitivity of the cam phase Cain to the high-frequency components of the phase control input Ucain becomes higher, and hence if the repetition period at which the modulated value u is calculated, i.e. the repetition period at which the phase control input Ucain is calculated is long, the inverting state of the phase control input Ucain is reflected in the cam phase Cain in a noise-like fashion. Therefore, the map is configured such that when Cain=Cainad, F_DSMFRQ=0 holds in all regions, so as to avoid such an inconvenience, by calculating the phase control input Ucain at the shorter repetition period ΔT2, and thereby enhance the control resolution and control accuracy.

Further, referring to FIG. 17, the map for Cain=Cainmi shown therein is configured such that when the engine speed NE is in a low speed region, or when the valve lift Liftin is in a low lift region, F_DSMFRQ=1 holds, whereas when then engine speed NE is in a high speed region and the valve lift Liftin is in a high lift region, F_DSMFRQ=0 holds. This is for the following reason: The valve overlap becomes smaller when Cain=Cainmi (=Cainad/2) holds than when Cain=Cainad holds, and hence the internal EGR rate decreases, which decreases the combustion variation, thereby preventing the occurrence of the rotational variation of the engine 3. As a consequence, the sensitivity of the cam phase Cain to the phase control input Ucain becomes lower, and hence even when the phase control input Ucain is calculated at a longer repetition period, the inverting state of the phase control input Ucain ceases to be reflected in the cam phase Cain in a noise-like fashion. Further, in the low engine speed region, for the reason stated hereinabove, the nonlinearities of the variable cam phase mechanism 70, such as hysteresis and dead time becomes stronger, and for the above-described reason ascribable to the method of calculation of the cam phase Cain, the control resolution becomes lower.

Therefore, the map is configured such that F_DSMFRQ=1 holds in the low engine speed region, to enhance the controllability by calculating the modulated value u in the phase control input Ucain at the longer repetition period ΔT1, depending on the strength of the nonlinearity of the variable cam phase mechanism 70 and the lowness of the cam phase control. Further, the map is configured such that when the valve lift Liftin is in the low lift region, F_DSMFRQ=1 holds, even if the engine 3 is in the high engine speed region, since the sensitivity of the cam phase Cain to the phase control input Ucain becomes low due to a decrease in the cam reaction force.

On the other hand, when the engine 3 is in the high value lift region, the cam reaction force becomes larger, so that the sensitivity of the cam phase Cain to the phase control input Ucain becomes higher than when the engine 3 is in the low valve lift region, and hence the map is configured such that F_DSMFRQ=0 holds in the high valve lift region.

Further, referring to FIG. 18, the map for Cain=Cainrt shown therein is configured such that the value of the modulated value selection flag F_DSMFRQ is set to have the same tendency as the map for Cain=Cainmi described hereinabove with reference to FIG. 17 has, and F_DSM-FRQ=0 holds in a broader region than in the map for Cain=Cainmi. This is because when Cain=Cainrt holds, the region in which the engine torque is large becomes broader, and the region in which the sensitivity of the cam phase Cain to the phase control input Ucain becomes high becomes broader, than when Cain=Cainmi holds.

In a step 24 following the step 23, it is determined whether or not the modulated value selection flag F_DSMFRQ set in the step 23 is equal to 1. If the answer to this question is affirmative (YES), i.e. if F_DSMFRQ=1 holds, the process proceeds to a step 25, wherein the first modulated value u1 stored in the RAM is sampled. The step 25 is executed at the operation period or repetition period of ΔTu shorter than the repetition period of 4·ΔTu (=ΔT1) at which the first modulated value u1 is calculated. Therefore, this corresponds to the oversampling of the first modulated value u1 to calculate the oversampled value u1(m) thereof.

Then, the process proceeds to a step 26, wherein the modulated value u is set to the first modulated value u1 sampled in the step 25.

On the other hand, if the answer to the question of the step 24 is negative (NO), i.e. if F_DSMFRQ=0 holds, the process proceeds to a step 27, wherein the second modulated value u2 stored in the RAM is sampled. The step 27 is executed at the operation period or repetition period of ΔTu shorter than the repetition period of 2·ΔTu (=ΔT2) at which the second modulated value u2 is calculated. Therefore, this corresponds to the oversampling of the second modulated value u2 to calculate the oversampled value u2(m) thereof.

Then, the process proceeds to a step 28, wherein the modulated value u is set to the second modulated value u2 sampled in the step 27.

In a step 29 following the step 26 or the step 28, the adaptive offset value Ucain_oft_adp stored in the RAM is sampled. The step 29 is executed at the operation period or repetition period of ΔTu shorter than the repetition period of 8·ΔTu (=ΔTk) at which the adaptive offset value Ucain_oft_adp is calculated in the step 16. Therefore, this corresponds to the oversampling of the adaptive offset value Ucain_oft_adp, to calculate the oversampled value Ucain_oft_adp(m) thereof.

Then, in a step 30, the phase control input Ucain is set to the sum of the modulated value u thus calculated and the adaptive offset value Ucain_oft_adp, followed by terminating the process.

Figure 19:
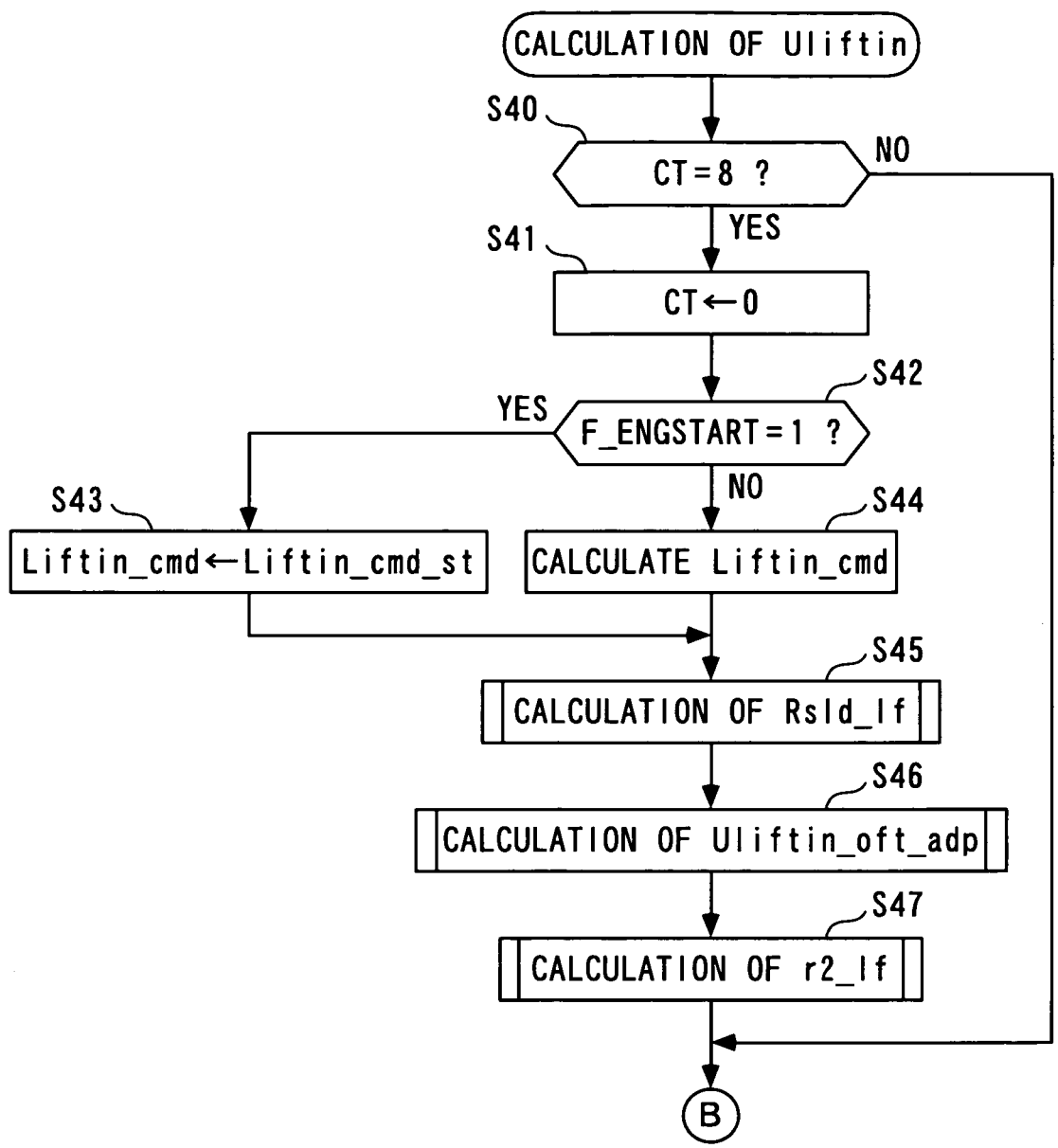
FIG. 19 is a flowchart showing part of a process for calculating a lift control input Uliftin.

Next, a process for calculating the lift control input Uliftin in the aforementioned step 4 is described with reference to FIGS. 19 and 20. This process is also executed at the predetermined control period ΔTu.

In this process, first, in a step 40, it is determined whether or not the counter value CT is equal to 8. If the answer to this question is negative (NO), i.e. if CT≠8 holds, the process proceeds to a step 48 in FIG. 20. On the other hand, if the answer to the question of the step 40 is affirmative (YES), i.e. if CT=8 holds, the process proceeds to a step 41, wherein the counter value CT is reset to 0.

Then, the process proceeds to a step 42, wherein it is determined whether or not an engine start flag F_ENG-START is equal to 1. If the answer to the question of the step 42 is affirmative (YES), i.e. if the engine is under the engine start control, the process proceeds to a step 43, wherein the target valve lift Liftin_cmd is set to a predetermined start value Liftin_cmd_st.

Figure 21:
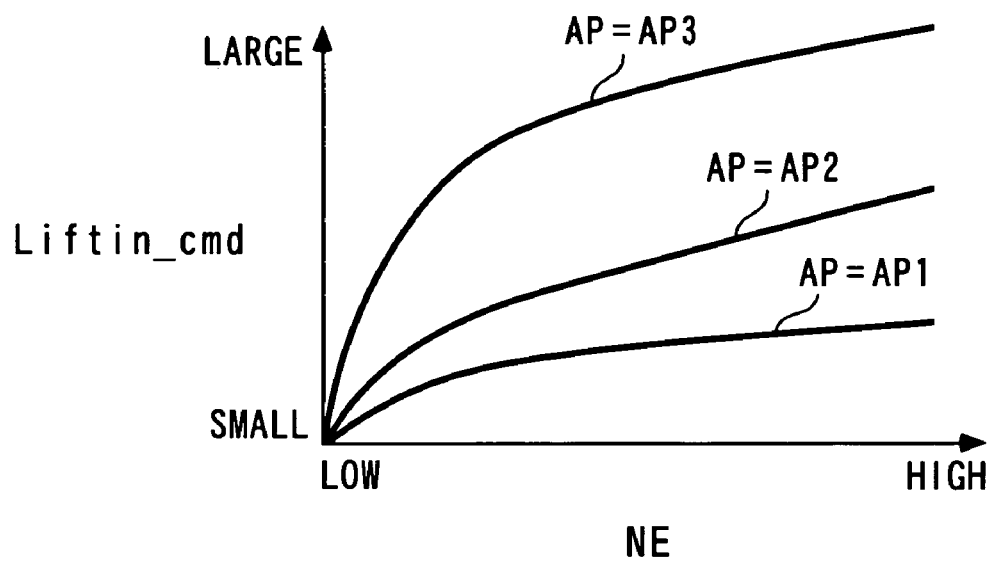
FIG. 21 is a diagram showing an example of a map for use in calculating a target valve lift Liftin_cmd.

On the other hand, if the answer to the question of the step 42 is negative (NO), i.e. if the engine 3 has already been started, the process proceeds to a step 44, wherein the target valve lift Uliftin_cmd is calculated by searching a map shown in FIG. 21 according to the engine speed NE and the accelerator pedal opening AP.

In this map, the target valve lift Liftin_cmd is set to a larger value as the engine speed NE is higher, or as the accelerator pedal opening AP is larger. This is because as the engine speed NE is higher, or as the accelerator pedal opening AP is larger, an output required of the engine 3 is larger, and hence a larger intake air amount is required.

Next, in a step 45, the follow-up control input Rsld_lf is calculated by the aforementioned equations (38) to (46), and the calculated value is stored in the RAM. Thereafter, the process proceeds to a step 46, wherein the adaptive offset value Uliftin_oft_adp is calculated by the aforementioned equations (48) to (56), and the calculated value is stored in the RAM.

Then, in a step 47, the limited value r2_lf is calculated by the aforementioned equations (57) to (61), and the calculated value is stored in the RAM. The above steps 45 to 47 are executed when CT=8 holds, and hence is executed at the control period of 8·ΔTu (=ΔTk).

Figure 20:
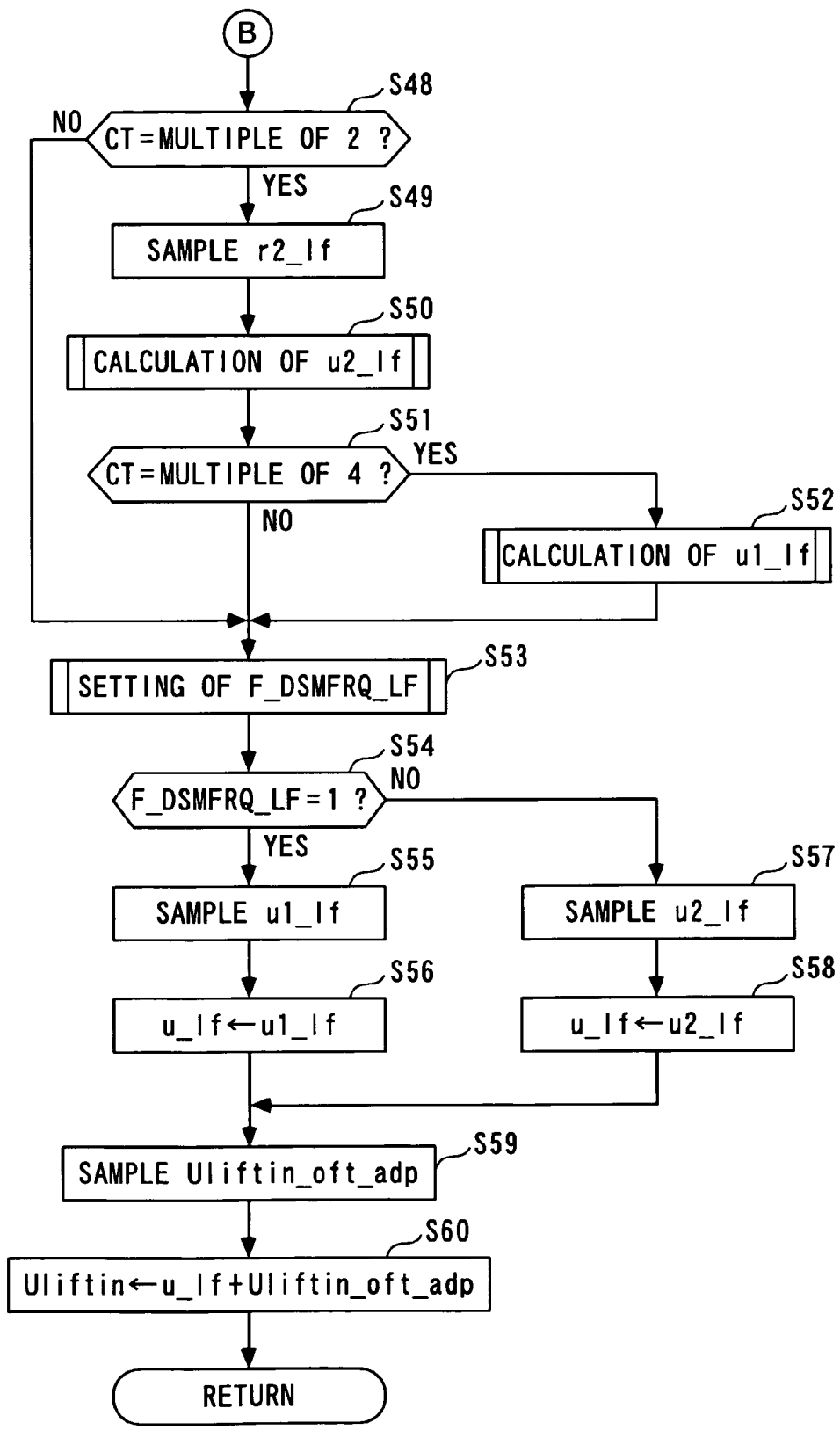
FIG. 20 is a continuation of FIG. 19.

In a step 48 in FIG. 20 following the step 40 or the step 47, it is determined whether or not the counter value CT is a multiple of 2. If the answer to this questions is negative (NO), the process proceeds to a step 53, referred to hereinafter.

On the other hand, if the answer to the question of the step 48 is affirmative (YES), i.e. if the counter value CT is a multiple of 2, the process proceeds to a step 49, wherein the limited value r2_lf stored in the RAM is sampled. This step 49 is executed when the counter value CT is a multiple of 2, and hence is executed at the operation period or repetition period of 2·ΔTu (=ΔT2) shorter than the operation period of 8·ΔTu at which the step 47 is executed. Therefore, this corresponds to the oversampling of the limited value r2_lf to calculate the oversampled value r2_lf(n2) thereof.

Then, in a step 50, the second modulated value u2_lf is calculated by the aforementioned equations (67) to (71).

Next, the process proceed to a step 51, wherein it is determined whether or not the counter value CT is a multiple of 4. If the answer to this question is negative (NO), the process proceeds to a step 53, referred to hereinafter.

On the other hand, if the answer to the question of the step 51 is affirmative (YES), i.e. if the counter value CT is a multiple of 4, the process proceeds to a step 52, wherein the first modulated value u1_lf is calculated by the aforementioned equations (62) to (66). This step 52 is executed when the counter value CT is a multiple of 4, and hence is executed at the operation period of 4·ΔTu (=ΔT1) shorter than the operation period of 8·ΔTu at which the step 47 is executed. Therefore, this corresponds to the calculation of the first modulated value u1_lf using the oversampled value r2_lf(n1) of the limited value r2_lf.

Figure 22:
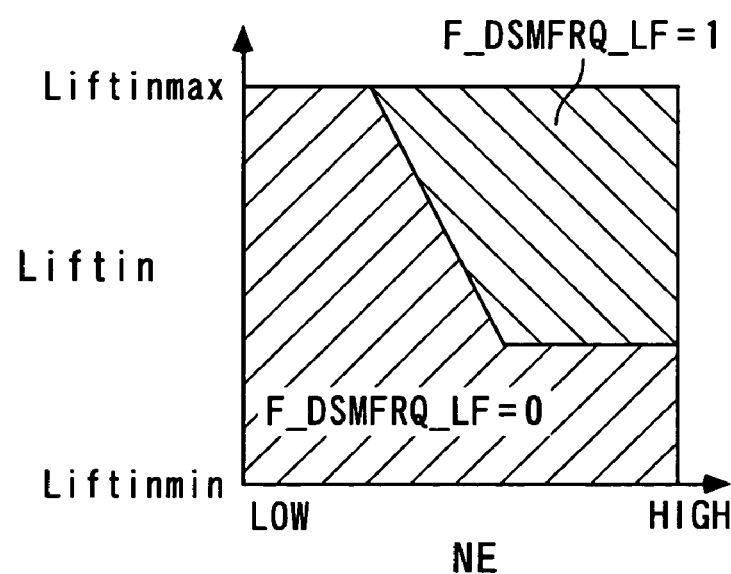
FIG. 22 is a diagram showing an example of a map for use in setting a modulated value selection flag F_DSMFRQ_LF.

In a step 53 following the step 48, the step 51, or the step 52, a modulated value selection flag F_DSMFRQ_LF is set to 1 or 0 by searching a map shown in FIG. 22 according to the engine speed NE and the valve lift Liftin, as described hereinafter.

This map is configured such that when the engine speed NE is in a low speed region, or when the valve lift Liftin is in a low lift region, F_DSMFRQ LF=0 holds, whereas when then engine speed NE is in a high speed region and the valve lift Liftin is in a high lift region, F_DSMFRQ_LF=1 holds. This is for the following reasons:

As described hereinbefore, when the intake camshaft 5 rotates, the amplitude of disturbance received by the motor 61 due to the cam reaction force is larger in a low engine speed region in which the frequency of the cam reaction force is lower than in a medium-to-high engine speed region, and varies with the change in the angle of the lower link 54, and particularly, when the lower link 54 is in the minimum lift position i.e. when Liftin=Liftinmin holds, the amplitude of disturbance becomes largest. Thus, when the motor 61 is vibrating with a large amplitude, if the inverting frequency of the lift control input Uliftin assumes a value close to the frequency of the vibration of the motor 61, the motor 61 undergoes resonance, lowering the controllability of the valve lift control. Therefore, the map is configured such that in the low engine speed region or in the low valve lift region, F_DSMFRQ_LF=0 holds, so as to avoid such a resonance by calculating the lift control input Uliftin at the shorter repetition period ΔT2. On the other hand, in the high engine speed and high valve lift region, no such a problem described above occurs, and hence the map is configured such that in such a region, F_DSMFRQ_LF=1 holds.

In a step 54 following the step 53, the modulated value selection flag F_DSMFRQ_LF set in the step 53 is equal to 1. If the answer to this question is affirmative (YES), i.e. if F_DSMFRQ_LF=1 holds, the process proceeds to a step 55, wherein the first modulated value u1_lf stored in the RAM is sampled. The step 55 is executed at the operation period or repetition period of ΔTu shorter than the repetition period of 4·ΔTu (=ΔT1) at which the first modulated value u1_lf is calculated. Therefore, this corresponds to the oversampling of the first modulated value u1_lf to calculate the oversampled value u1_lf(m) thereof.

Then, the process proceeds to a step 56, wherein the modulated value u1_lf is set to the first modulated value u1_lf sampled in the step 55.

On the other hand, if the answer to the question of the step 54 is negative (NO), i.e. if F_DSMFRQ_LF=0 holds, the process proceeds to a step 57, wherein the second modulated value u2_lf stored in the RAM is sampled. The step 57 is executed at the repetition period of ΔTu shorter than the repetition period of 2·ΔTu (=ΔT2) at which the second modulated value u2_lf is calculated. Therefore, this corresponds to the oversampling of the second modulated value u2_lf to calculate the oversampled value u2_lf(m) thereof.

Then, the process proceeds to a step 58, wherein the modulated value u_lf is set to the second modulated value u2_lf sampled in the step 57.

In a step 59 following the step 56 or 58, the adaptive offset value Uliftin_oft_adp stored in the RAM is sampled. The step 59 is executed at the operation period or repetition period of ΔTu shorter than the repetition period of 8·ΔTu (=ΔTk) at which the adaptive offset value Uliftin_oft_adp is calculated. Therefore, this corresponds to the oversampling of the adaptive offset value Uliftin_oft_adp to calculate the oversampled value Uliftin_oft_adp(m) thereof.

Then, in a step 60, the lift control input Uliftin is set to the sum of the modulated value u_lf thus calculated and the adaptive offset value Uliftin_oft_adp, followed by terminating the process.

Figure 23:
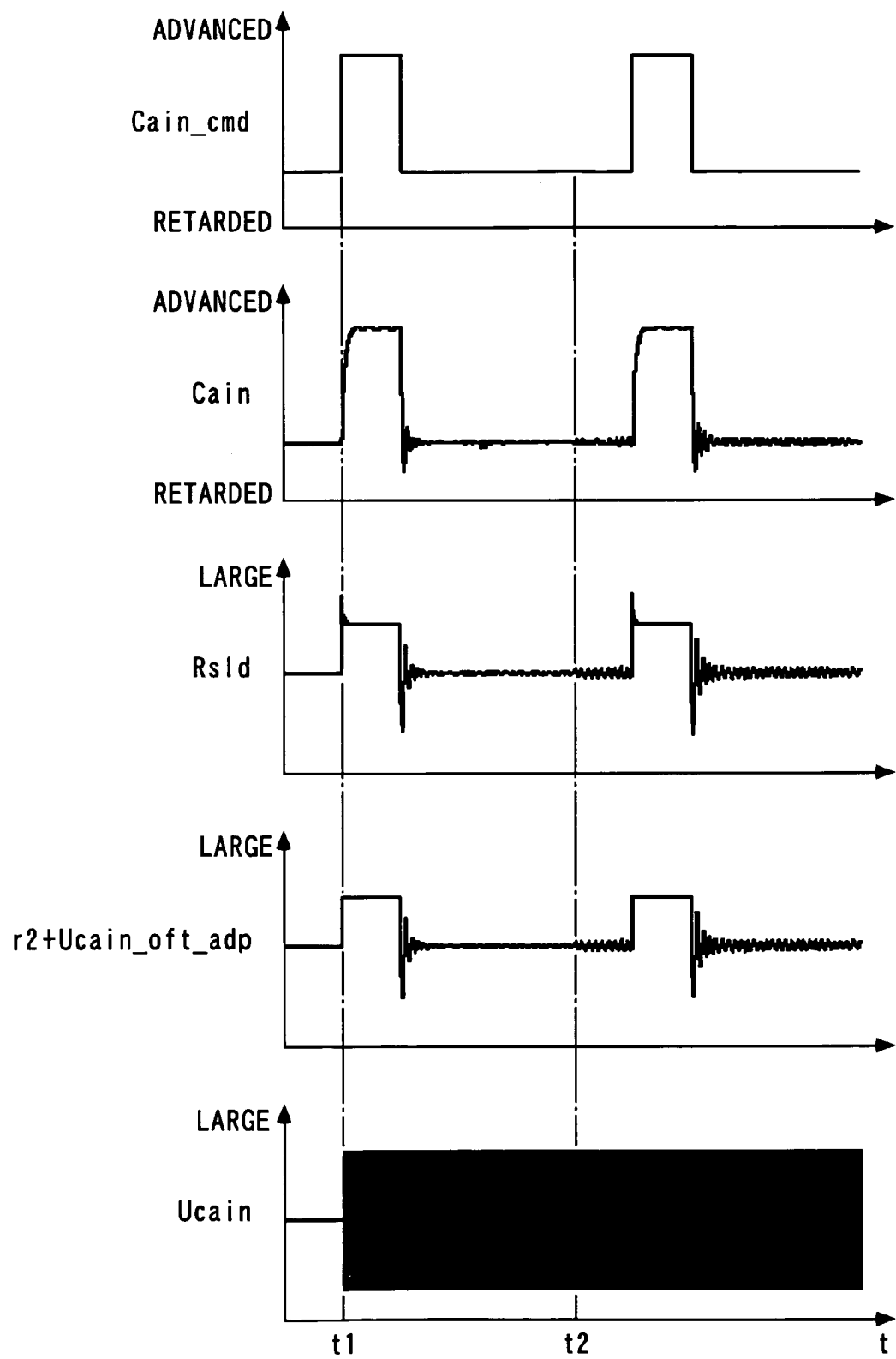
FIG. 23 is a timing diagram showing an example of a simulation of cam phase control executed by the control apparatus according to the first embodiment.

Next, a description will be given of results of a simulation of the control of the cam phase Cain (hereinafter referred to as "the control results"), executed by the control apparatus 1 according to the present embodiment. First, FIG. 23 shows an example of the control results obtained by the control apparatus according to the present embodiment. Particularly between time t1 to time t2, there are illustrated control results obtained in a region where the high-frequency sensitivity of the cam phase Cain is high, i.e. in a high engine speed region, a high load region, or an operating region in which the EGR rate is high, and after the time t2, there are illustrated control results obtained in a region where the resolution of the cam phase control is low, and the nonlinearity of the variable cam phase mechanism 70 is high, i.e. in a low engine speed region.

Figure 24:
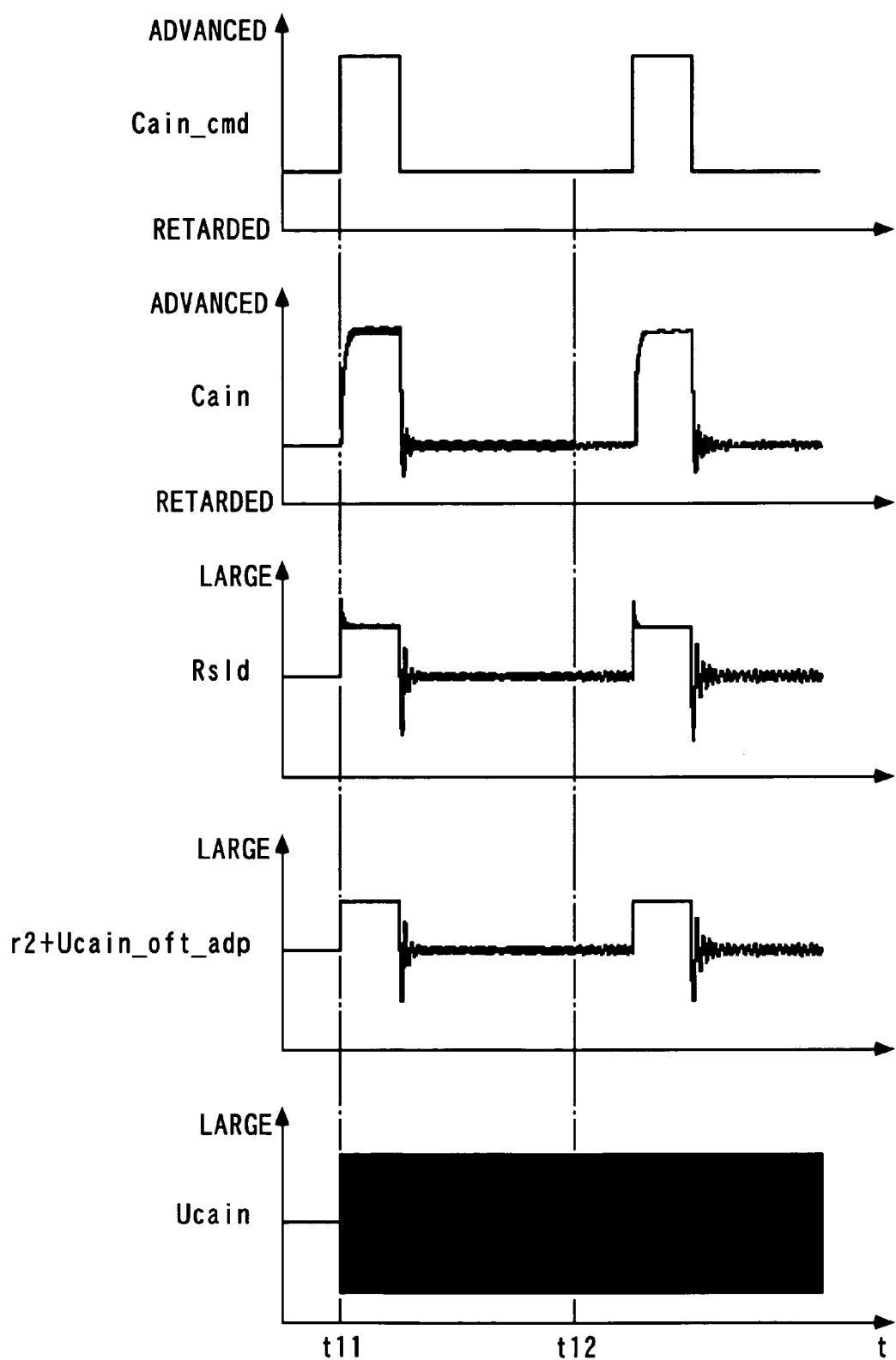
FIG. 24 is a timing diagram showing a comparative example of results of a simulation of cam phase control.
Figure 25:
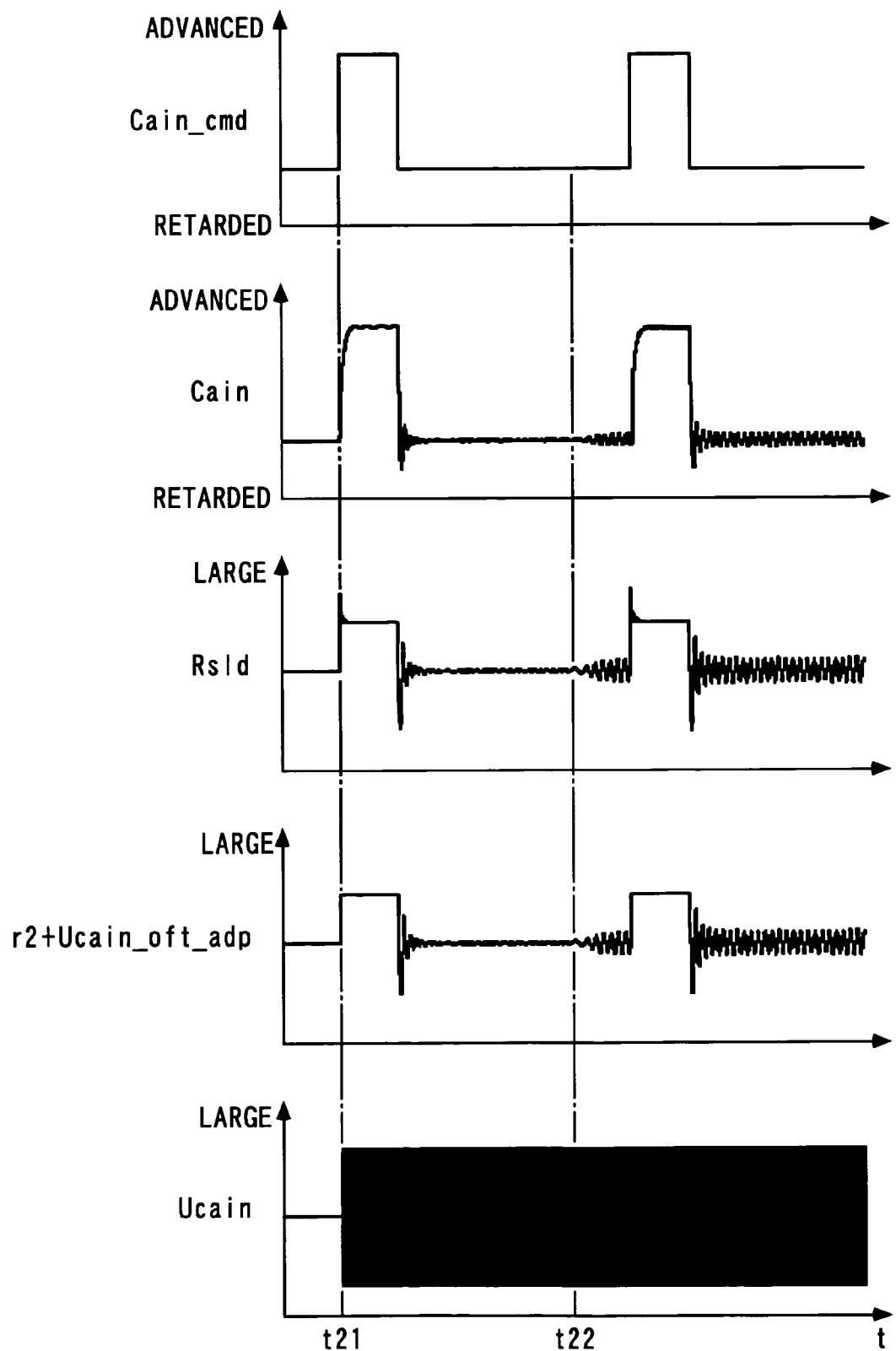
FIG. 25 is a timing diagram showing another comparative example of results of a simulation of cam phase control.

Further, FIGS. 24 and 25 shows control results of a comparative example of the control executed by calculating the modulated value u of the phase control input Ucain while holding the repetition period at respective predetermined control periods ΔT1 and ΔT2, without changing the same. In these figures as well, between time t11 to time t12, and time t21 to time t22, there are illustrated control results obtained when the engine 3 is in a region where the high-frequency sensitivity of the cam phase Cain is high, and after the time t12 and the time t22, there are illustrated control results obtained when the engine is in a region where the resolution of the cam phase control is low, and the nonlinearity of the variable cam phase mechanism 70 is high. It should be noted that the control results shown in the three figures are obtained when the adaptive offset value Ucain_oft_adp is held at a fixed value for ease of understanding.

First, comparison is made between the control results shown in FIG. 24 and those shown in FIG. 25, when the engine is in the region where the high-frequency sensitivity of the cam phase Cain is high after the start of the control (time t11 to time t12 and time t21 to time t22), the degree of deviation of the cam phase Cain from the target cam phase Cain_cmd is larger in the FIG. 24 comparative example than in the FIG. 25 comparative example, which means that the control accuracy is lower. This is because in the case of the FIG. 24 comparative example, the repetition period ΔT1 (i.e. the repetition period of the modulated value u) is longer than the repetition period ΔT2 at which the same is calculated in the FIG. 25 comparative example, and hence the inverting behavior of the phase control input Ucain is reflected in the cam phase Cain in a noise-like fashion. Form the above, it is known that in a region where the high-frequency sensitivity of the cam phase Cain is high, by setting the repetition period at which the phase control input Ucain is calculated to the shorter value ΔT2, the control resolution and the control accuracy are enhanced.

On the other hand, in a region where the control resolution of the variable cam phase mechanism 70 is low, and the nonlinearity of the same is strong (after the time point t12 and the time t22), it is known that the deviation of the cam phase Cain from the target cam phase Cain_cmd is larger, and hence the control accuracy is lower in the FIG. 25 comparative example than in the FIG. 24 comparative example. This is because in the case of the FIG. 25 comparative example, in spite of the engine 3 being in a region where the variable cam phase mechanism 70 is low in control resolution and strong in nonlinearity, the phase control input Ucain is calculated at the shorter repetition period ΔT2 than in the case of the FIG. 24 comparative example, and hence the low control resolution and the strong linearity places the control system in an unstable state. From the above, it is understood that when the engine 3 is in a region where the variable cam phase mechanism 70 is low in control resolution and strong in nonlinearity, by setting the repetition period at which the phase control input Ucain is calculated to the longer value ΔT1, the control resolution and the control accuracy are enhanced.

In contrast, according to the control results shown in FIG. 23 which are obtained by the control apparatus 1 according to the present embodiment, it is known that when the engine 3 is in a region where the high-frequency sensitivity of the cam phase Cain is high, the second modulated value u2 calculated at the shorter repetition period ΔT2 is selected as the modulated value u, and when the engine 3 is in a region where the variable cam phase mechanism 70 is low in control resolution and strong in non linearity, the first modulated value u1 calculated at the longer repetition period ΔT1 is selected as the modulated value u, whereby in both the regions, the control resolution and the control accuracy can be maintained at respective high levels.

As described above, according to the control apparatus 1 of the present embodiment, the cam phase controller 100 selects, as the modulated value u, the first modulated value u1 calculated at the longer repetition period ΔT1 when the modulated value selection flag F_DSMFRQ=1 holds, and the second modulated value u2 calculated at the shorter repetition period ΔT2, when F_DSMFRQ=0 holds, and calculates the phase control input Ucain based on the selected modulated value u. Further, the value of the modulated value selection flag F_DSMFRQ is set in the aforementioned maps such that F_DSMFRQ=0 holds in the region where the high-frequency sensitivity of the cam phase Cain is high, and F_DSMFRQ=1 hoods in the region where the resolution of the cam phase control is low and the nonlinearity of the variable cam phase mechanism 70 is strong.

Therefore, in the region where the high-frequency sensitivity of the cam phase Cain is high, the phase control input Ucain is calculated at the shorter repetition period ΔT2, and hence, it is possible to eliminate the inconvenience occurring when the phase control input Ucain is calculated at the longer repetition period in such a region, i.e. the inconvenience of the inverting state of the phase control input Ucain being reflected in the cam phase Cain in a noise-like fashion, whereby it is possible to maintain the control resolution and the control accuracy at respective high levels. On the other hand, in the region where the resolution of the cam phase control is low, and the nonlinearity of the variable cam phase mechanism 70 is strong, the phase control input Ucain is calculated at the longer repetition period ΔT1, and hence it is possible to eliminate the inconvenience occurring when the phase control input is calculated at the shorter repetition period ΔT2 Ucain in such a region, i.e. the inconvenience of the control resolution being lowered, whereby it is possible to maintain the control resolution and the control accuracy at respective high levels. As described above, even when the frequency characteristic and/or the nonlinearity of the controlled object 90 vary/varies due to changes in the operating conditions of the engine 3 or the like, it is possible to maintain the control resolution and the control accuracy at respective high levels.

Further, the phase control input Ucain is calculated as a value which is inverted with an amplitude of 2·R1 or 2·R2 with the adaptive offset value Ucain_oft_adp as the center of the inversion, and the adaptive offset value Ucain_oft_adp is calculated as a value which gently follows a change in the follow-up control input Rsld, and exceeds neither the upper limit value Ucain_oft_max nor the lower limit value Ucain_oft_min, as described hereinabove. Therefore, even when there occurs a state in which the cam phase Cain largely deviates from the target cam phase Cain_cmd, and the range of variation in the follow-up control input Rsld is large, differently from the case where the central value of the amplitude of the phase control input Ucain is not changed, it is possible to cause the cam phase Cain to follow the target cam phase Cain_cmd while preventing the phase control input Ucain from becoming excessively large. As a result, it is possible to further enhance the control resolution and the control accuracy.

Further, the follow-up control input Rsld undergoes a smaller change as the cam phase Cain becomes closer to the target cam phase Cain_cmd, and the modulated value u is calculated by modulating the limited value r2 obtained by subjecting the difference between the follow-up control input Rsld and the adaptive offset value Ucain_oft_adp to the limiting process, with the modulation algorithm based on the Δ Σ modulation algorithm. Therefore, the phase control input Ucain is calculated as a value which is higher in inverting frequency as the cam phase Cain becomes closer to the target cam phase Cain_cmd. This makes it possible to improve the convergence of the cam phase Cain to the target cam phase Cain_cmd compared with the case in which the phase control input Ucain is calculated by PWM or dithering with a fixed inverting frequency.

The valve lift controller 200 selects, as the modulated value u_lf, the first modulated value u1_lf calculated at the longer repetition period ΔT1, when the modulated value selection flag F_DSMFRQ_LF=1 holds, and the second modulated value u2_lf calculated at the shorter repetition period ΔT2, when F_DSMFRQ_LF=0 holds, and calculates the lift control input Uliftin based on the selected modulated value u_lf. Further, the value of the modulated value selection flag F_DSMFRQ_LF is set in the aforementioned map such that F_DSMFRQ_LF=0 holds in the low engine speed or low valve lift region, and F_DSMFRQ_LF=1 holds in the other regions.

Therefore, in the low engine speed or low valve lift region, the lift control input Uliftin is calculated at the shorter repetition period ΔT2, and hence, it is possible to eliminate the inconvenience occurring when the lift control input Uliftin is calculated at the longer repetition period in such a region, i.e. the inconvenience of the motor 61 of the lift actuator undergoing resonance, whereby it is possible to maintain the control resolution and the control accuracy at respective high levels. As described above, even when the frequency characteristic of the controlled object 190 varies due to changes between the low engine speed or low valve lift region and the other regions of the operating conditions of the engine 3, it is possible to maintain the control resolution and the control accuracy at respective high levels.

Further, the lift control input Uliftin is calculated, by the same computation method as employed for the calculation of by the phase control input Ucain, as described hereinabove, as a value which is inverted with an amplitude of 2·R1_lf or 2·R2_lf with the adaptive offset value Uliftin_oft_adp as the center of the inversion, and the adaptive offset value Uliftin_oft_adp is calculated as a value which gently follows a change in the follow-up control input Rsld_lf, and exceeds neither the upper limit value Uliftin_oft_max and nor the lower limit value Uliftin_oft_min. Therefore, even when there occurs a state in which the valve lift Liftin largely deviates from the target valve lift Liftin_cmd, and the range of variation in the follow-up control input Rsld_lf is large, differently from the case where the central value of the amplitude of the lift control input Uliftin is not changed, it is possible to cause the valve lift Liftin to follow the target valve lift Liftin_cmd while preventing the lift control input Uliftin from becoming excessively large. As a result, it is possible to further enhance the control resolution and the control accuracy.

What is more, the modulated value u_lf is calculated by modulating the limited value r2_lf obtained by subjecting the difference between the follow-up control input Rsld_lf and the adaptive offset value Uliftin_oft_adp to the limiting process, with the modulation algorithm based on the Δ Σ modulation algorithm. Therefore, the lift control input Uliftin is calculated as a value which is higher in inverting frequency as the valve lift Liftin becomes closer to the target valve lift Liftin_cmd. This makes it possible to improve the convergence of the valve lift Liftin to the target valve lift Liftin_cmd compared with the case in which the lift control input Uliftin is calculated by PWM or dithering with a fixed inverting frequency.

Although the first embodiment is an example in which the target value filter-type two-degree-of-freedom sliding mode control algorithms are employed as the control algorithms for calculating the follow-up control inputs Rsld and Rsld_lf, the control algorithms for use in the calculation of the follow-up control inputs according to the invention are not limited to these, but any suitable control algorithms may be employed insofar as the follow-up control inputs can be calculated as respective values which can cause controlled variables to follow target values. For example, there may be employed general feedback control algorithms, such as PID control algorithms, and response-specifying control algorithms, such as back-stepping control algorithms and sliding mode control algorithms.

Although in the first embodiment, as the algorithm for calculating the first modulated value u1 and the second modulated value u2 by modulating the limited value r2, the algorithms (equations (25) to (29) and (30) to (34)) based on the $\Delta \Sigma$ modulation algorithm, are used by way of example, this is not limitative, but any suitable modulation algorithms may be employed insofar as they are capable of calculating the first modulated value u1 and the second modulated value u2 by modulating the limited value r2. For example, as the algorithms for modulating the limited value r2, there may be employed PWM (Pulse Width Modulation) algorithms or algorithms with which the limited value r2 is modulated by dithering.

Further, in the first embodiment, in the step 22 in FIG. 14, the first modulation section 108 may calculate the first modulated value u1 using a modulation algorithm which is based on the $\Sigma \Delta$ modulation algorithm and expressed by the following equations (75) to (80) in place of the algorithm expressed by the aforementioned equations (25) to (29), and in the step 20, the second modulating 111 may calculate the second modulated value u2 using a modulation algorithm based on the $\Sigma \Delta$ modulation algorithm expressed by the following equations (81) to (86) in place of the algorithm expressed by the aforementioned equations (30) to (34).

$$\sigma r1(n1)=\sigma r1(n1-1)+r2(n1) \tag{75}$$

$$\sigma u1(n1)=\sigma u1(n1-1)+u1(n1-1) \tag{76}$$

$$\delta1(n1)=\sigma r1(n1)-\sigma u1(n1) \tag{77}$$

$$u1(n1)=fnl(\delta1(n1)) \tag{78}$$

WHEN $\delta1(n1)\geq 0$, $$fnl(\delta1(n1))=-R1 \tag{79}$$

WHEN $\delta1(n1)<0$, $$fnl(\delta1(n1))=-R1 \tag{80}$$

$$\sigma r2(n2)=\sigma r2(n2-1)+r2(n2) \tag{81}$$

$$\sigma u2(n2)=\sigma u2(n2-1)+u2(n2-1) \tag{82}$$

$$\delta2(n2)=\sigma r2(n2)-\sigma u2(n2) \tag{83}$$

$$u2(n2)=fnl(\delta2(n2)) \tag{84}$$

WHEN $\delta2(n2)\geq 0$, $$fnl(\delta2(n2))=R2 \tag{85}$$

WHEN $\delta2(n2)<0$, $$fnl(\delta2(n2))=-R2 \tag{86}$$

Also when the first modulated value u1 and the second modulated value u2 are calculated with the aforementioned modulation algorithms based on the $\Sigma \Delta$ modulation algorithm, and the phase control input Ucain is calculated using these modulated values, it is possible to obtain the same advantageous effects as provided by the first embodiment. Particularly, as the reference input r1 becomes closer to a value of 0, i.e. as the follow-up control input Rsld undergoes a less change in the vicinity of the adaptive offset value Ucain_oft_adp with the cam phase Cain being close to the target cam phase Cain_cmd, the inverting frequency of the phase control input Ucain becomes higher. Therefore, compared with the case of using the phase control input Ucain modulated by PWM or dithering with a fixed inverting frequency, it is possible to improve the convergence of the cam phase Cain to the target cam phase Cain_cmd.

Further, in the first embodiment, in the step 22 in FIG. 14, the first modulation section 108 may calculate the first modulated value u1 using a modulation algorithm which is based on the $\Delta$ modulation algorithm and expressed by the following equations (87) to (91) in place of the aforementioned equations (25) to (29), and in the step 20 in FIG. 14, the second modulation section 111 may calculate the second modulated value u2 using a modulation algorithm which is based on the $\Delta$ modulation algorithm and expressed by the following equations (92) to (96) in place of the aforementioned equations (30) to (34).

$$\sigma u1(n1)=\sigma u1(n1-1)+u1(n1-1) \tag{87}$$

$$\delta1(n1)=r2(n1)-\sigma u1(n1) \tag{88}$$

$$u1(n1)=fnl(\delta1(n1)) \tag{89}$$

WHEN $\delta1(n1)\geq 0$, $$fnl(\delta1(n1))=R1 \tag{90}$$

WHEN $\delta1(n1)<0$, $$fnl(\delta1(n1))=-R1 \tag{91}$$

$$\sigma u2(n2)=\sigma u2(n2-1)+u2(n2-1) \tag{92}$$

$$\delta2(n2)=r2(n2)-\sigma u2(n2) \tag{93}$$

$$u2(n2)=fnl(\delta2(n2)) \tag{94}$$

WHEN $\delta2(n2)\geq 0$, $$fnl(\delta2(n2))=R2 \tag{95}$$

WHEN $\delta2(n2)<0$, $$fnl(\delta2(n2))=-R2 \tag{96}$$

Also when the first modulated value u1 and the second modulated value u2 are calculated with the aforementioned modulation algorithms based on the $\Delta$ modulation algorithm, and the phase control input Ucain is calculated using these modulated values, it is possible to obtain the same advantageous effects as provided by the first embodiment. Particularly, as the reference input r1 becomes closer to a value of 0, i.e. as the follow-up control input Rsld undergoes a less change in the vicinity of the adaptive offset value Ucain_oft_adp with the cam phase Cain being close to the target cam phase Cain_cmd, the inverting frequency of the phase control input Ucain becomes higher. Therefore, compared with the case of using the phase control input Ucain modulated by PWM or dithering with a fixed inverting frequency, it is possible to improve the convergence of the cam phase Cain to the target cam phase Cain_cmd.

Further, it is to be understood that the first modulated value u1_lf and the second modulated value u2_lf may be calculated with the aforementioned modulation algorithms based on the Σ Δ modulation algorithm or the Δ modulation algorithm.

Further, although in the first embodiment, one of the two modulated values u1 and u2 (or u1_lf and u2_lf) calculated at the respective two repetition periods ΔT1 and ΔT2 is selected as the modulated value u (or u_lf) according to the operating conditions of the engine 3 and the like, by way of example, this is not limitative, but it is possible to select one of three or more modulated values calculated at respective three or more different repetition periods, according to the operating conditions of the engine 3 and the like.

Further, although in the first embodiment, the follow-up control input Rsld is divided into two input components r1 and Ucain_oft_adp, and the phase control input Ucain is calculated based on the value u corresponding to a modulated value of the one input component r1 of the divisional components and the remaining input component Ucain_oft_adp, by way of example, this is not limitative, but the phase control input Ucain may be calculated by dividing the follow-up control input Rsld into there or more input components, and using a modulated value of one of the divisional input components and the other input components. Similarly to this, the lift control input Uliftin may be calculated by dividing the follow-up control input Rsld_lf into there or more input components, and using a value corresponding to a modulated value of one of the divisional input components and the other input components.

On the other hand, although in the first embodiment, the control apparatus 1 according to the present invention is applied to the hydraulically-driven variable cam phase mechanism 70 which changes the cam phase Cain with oil pressure, by way of example, this is not limitative, but the control apparatus according to the present invention can be applied to an electromagnetically-driven variable cam phase mechanism which changes the cam phase Cain with an electromagnetic force, or a variable cam phase mechanism which changes the phase of the exhaust camshaft 8 relative to the crankshaft 3d with oil pressure or an electromagnetic force.

Further, in the first embodiment, the control apparatus 1 according to the present invention is applied to the variable valve lift mechanism 50 which changes the lift of the intake valves 4, by way of example, this is not limitative, but the control apparatus according to the present invention can be also applied to a valve lift mechanism that changes the lift of the exhaust valves 7.

Figure 26:
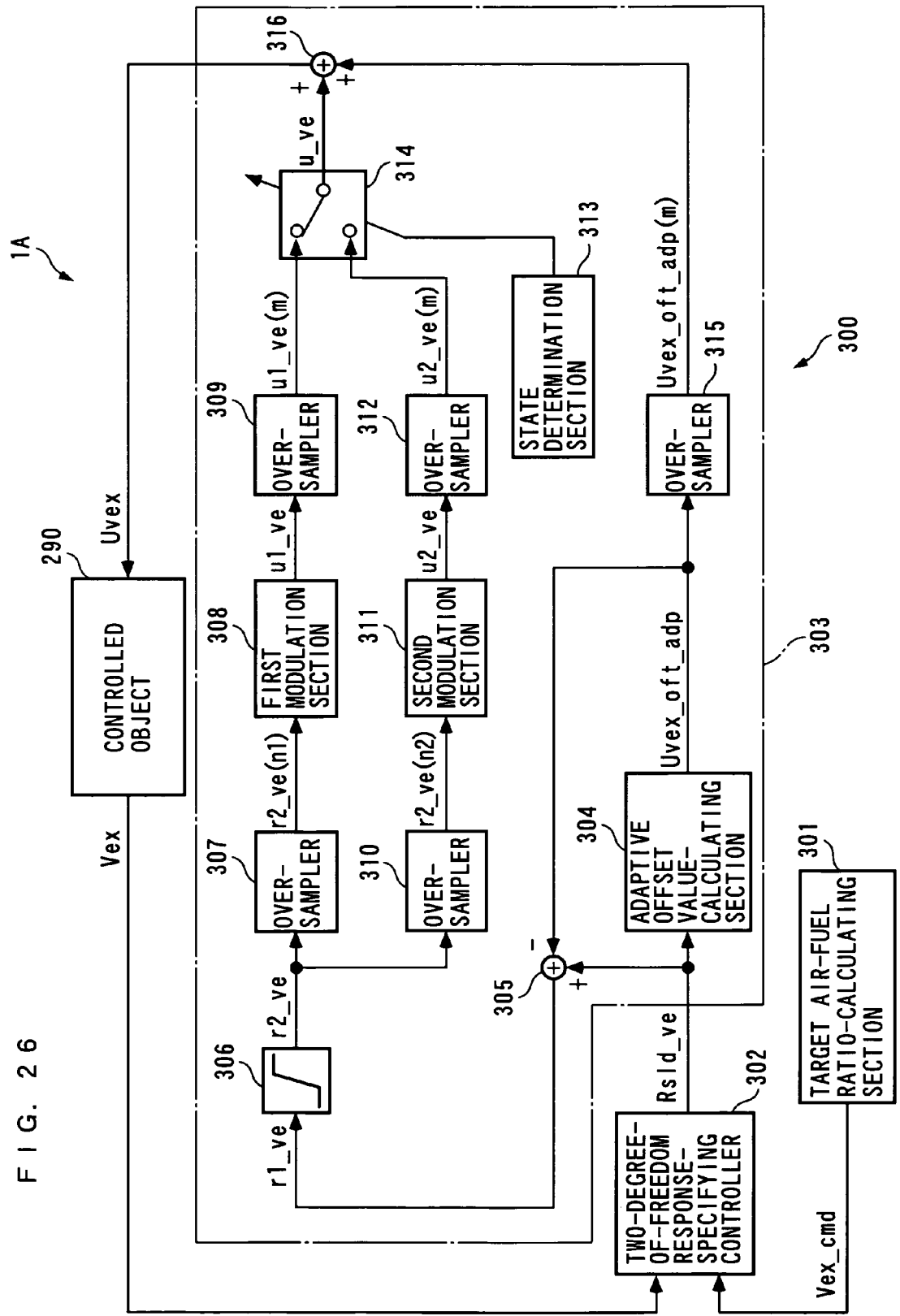
FIG. 26 is a schematic block diagram of an air-fuel ratio controller.

Next, a description will be given of a control apparatus 1A according to a second embodiment of the present invention. It should be noted that in the following description, component parts thereof identical to those of the first embodiment are designated by identical reference numerals, and detailed description thereof is omitted. As shown in FIG. 26, the control apparatus 1A includes an air-fuel ratio controller 300, which is implemented by the ECU 2.

The air-fuel ratio controller 300 controls the actual air-fuel ratio Vex as a controlled variable by inputting an air-fuel ratio control input Uvex to a controlled object 290. The controlled object 290 corresponds to an air-fuel ratio control system including the LAF sensor 24 (controlled variable-detecting means) and the fuel injection valves 10.

The air-fuel ratio controller 300 calculates, as described in detail hereinbelow, by the same computation method as employed by the controllers 100, 200 in the first embodiment, the air-fuel ratio control input Uvex, and the air-fuel ratio control input Uvex is input to the controlled object 290, whereby the actual air-fuel ratio Vex is controlled such that it follows the target air-fuel ratio Vex_cmd.

As shown in FIG. 26, the air-fuel ratio controller 300 is comprised of a target air-fuel ratio-calculating section 301, a two-degree-of-freedom response-specifying controller 302, and a DSM controller 303.

The target air-fuel ratio-calculating section 301 calculates, as described hereinafter, the target air-fuel ratio Vex_cmd, e.g. by searching a map, not shown, according to operating conditions of the engine 3 (the accelerator pedal opening AP, the intake air amount Gcyl, etc.). It should be noted that in the present embodiment, the target air-fuel ratio-calculating section 301 corresponds to target value-setting means, and the target air-fuel ratio Vex_cmd corresponds to the target value.

The two-degree-of-freedom response-specifying controller 302 calculates the follow-up control input Rsld_ve for air-fuel ratio control with a target value filter-type two-degree-of-freedom sliding mode control algorithm expressed by the following equations (97) to (105) as a value for causing the actual air-fuel ratio Vex to follow the target air-fuel ratio Vex_cmd. It should be noted that the two-degree-of-freedom response-specifying controller 302 corresponds to the follow-up control input-calculating means.

$$Vex\_cmd\_f(k) = -POLE\_f\_ve \cdot Vex\_cmd\_f(k-1) + (1 + POLE\_f\_ve) \cdot Vex\_cmd(k) \tag{97}$$

$$Rsld\_ve(k) = Req\_ve(k) + Rrch\_ve(k) + Radp\_ve(k) + Rdamp\_ve(k) \tag{98}$$

$$Req\_ve(k) = \frac{1}{b1\_ve}\{(1 - a1\_ve - POLE\_ve) \cdot Vex(k) + \tag{99}$$

$$(POLE\_ve - a2\_ve) \cdot Vex(k-1) - b2\_ve \cdot Rsld\_ve'(k-1) +$$

$$Vex\_cmd\_f(k) + (POLE\_ve - 1) \cdot Vex\_cmd\_f(k-1) -$$

$$POLE\_ve \cdot Vex\_cmd\_f(k-2)\}$$

$$Rsld\_ve'(k-1) = r2\_ve(k-1) + Uvex\_oft\_adp(k-1) \tag{100}$$

$$Rrch\_ve(k) = \frac{-Krch\_ve}{b1\_ve} \cdot \sigma s\_ve(k) \tag{101}$$

$$Radp\_ve(k) = \frac{-Kadp\_ve}{b1\_ve} \cdot \sum_{i=0}^{k} \sigma s\_ve(i) \tag{102}$$

$$Rdamp\_ve(k) = -Kdamp\_ve \cdot \{Vex(k) - Vex(k-1)\} \tag{103}$$

$$\sigma s\_ve(k) = e\_ve(k) + POLE\_ve \cdot e\_ve(k-1) \tag{104}$$

$$e\_ve(k) = Vex(k) - Vex\_cmd\_f(k-1) \tag{105}$$

In the above-described control algorithm, first, a filtered value Vex_cmd_f of the target air-fuel ratio is calculated with a first-order lag filter algorithm expressed by the equation (97). In the equation (97), POLE_f_ve represents a target value filter-setting parameter set to a value which satisfies the relationship of $-1<\text{POLE\_f\_ve}<0$.

Next, the follow-up control input Rsld_ve for the air-fuel ratio control is calculated with a sliding mode control algorithm expressed by the equations (98) to (105). That is, as shown in the equation (98), the follow-up control input Rsld_ve for the air-fuel ratio control is calculated as the total sum of an equivalent control input Req_ve, a reaching law input Rrch_ve, an adaptive law input Radp_ve, and a damping input Rdamp_ve.

The equivalent control input Req_ve is calculated using the equation (99). In the equation (99), parameters a1_ve, a2_ve, b1_ve, and b2_ve represent model parameters of a model, referred to hereinafter, and are set to respective predetermined values. Further, In the equation (99), POLE_ve represents a switching function-setting parameter set to a value which satisfies the relationship of $-1<\text{POLE\_f\_ve}<\text{POLE\_ve}<0$. Further, Rsld_ve' in the equation (99) represents the immediately preceding equivalent value of the follow-up control input calculated by the equation (100). In the equation (100), r2_ve represents a limited value calculated by the limiter 306, as described hereinbelow, and Uvex_oft_adp represents an adaptive offset value which is calculated by the adaptive offset value-calculating section 304, as described hereinafter.

Further, the reaching law input Rrch_ve is calculated using the equation (101). In the equation (101), Krch_ve represents a predetermined reaching law gain, and σs_ve represents a switching function defined by the equation (104). The symbol e_ve in the equation (104) represents a difference defined by the equation (105).

Furthermore, the adaptive law input Radp_ve is calculated by the equation (102). In the equation (102), Kadp_ve represents a predetermined adaptive law gain. On the other hand, the damping input Rdamp_ve is calculated by the equation (103). In the equation (103), Kdamp_ve represents a predetermined damping gain.

The equations (97) to (105) are derived as follows: When the controlled object is defined as a system to which the follow-up control input Rsld_ve for the air-fuel ratio control is input as a control input, to thereby control the actual air-fuel ratio Vex as a controlled variable, and this system is modeled into a discrete-time system model, the following equation (106) is obtained:

$$Vex(k+1)=a1\_ve \cdot Vex(k)+a2\_ve \cdot Vex(k-1)+b1\_ve \cdot Rsld\_ve(k)+b2\_ve \cdot Rsld\_ve(k-1) \quad (106)$$

To the controlled object thus modeled, the target filter-type two-degree-of-freedom sliding mode control theory is applied such that the actual air-fuel ratio Vex follows the target air-fuel ratio Vex_cmd, and for the same reason as that for using the immediately preceding equivalent value Rsld' of the follow-up control input, described hereinabove, the immediately preceding value Rsld_ve(k−1) of the above-mentioned follow-up control input on the right side of the equation of the equivalent input Req_ve is replaced by the immediately preceding equivalent value Rsld_ve' (k−1) of the above-mentioned follow-up control input, whereby the aforementioned equations (97) to (105) are derived.

Next, a description will be given of the DSM controller 303. The DSM controller 303 calculates the air-fuel ratio control input Uvex based on the follow-up control input Rsld_ve, as described hereafter, and is comprised of an adaptive offset value-calculating section 304, a subtractor 305, a limiter 306, five oversamplers 307, 309, 310, 312, and 315, a first modulation section 308, a second modulation section 311, a state determination section 313, a modulated value-selecting section 314, and an adder 316, as shown in FIG. 26. It should be noted that in the present embodiment, the DSM controller 303 corresponds to the control input-calculating means.

The adaptive offset value-calculating section 304 calculates the adaptive offset value Uvex_oft_adp based on the follow-up control input Rsld_ve with an algorithm described hereinafter.

First, an unprocessed value Uvex_oft_adp' of the adaptive offset value is calculated with a rate-limiting process algorithm expressed by the following equations (107) to (111):

$$Uvex\_oft\_adp'(k)=Uvex\_oft\_adp(k-1)+Duvex\_\text{mod}(k) \quad (107)$$

WHEN Eps_ve≦Duvex(k), $$Duvex\_\text{mod}(k)=Eps\_ve \quad (108)$$

WHEN −Eps_ve(k)<Duvex(k)<Eps_ve, $$Duvex\_\text{mod}(k)=Duvex(k) \quad (109)$$

WHEN Duvex(k)≦−Eps_ve, $$Duvex\_\text{mod}(k)=-Eps\_ve \quad (110)$$

$$Duvex(k)=Rsld\_ve(k)-Uvex\_oft\_adp(k-1) \quad (111)$$

In the equation (107), Duvex_mod represents an amount of change in the unprocessed value Uvex_oft_adp', and is calculated, as shown in the equations (108) to (111), by subjecting the difference Duvex between the present value of the follow-up control input Rsld_ve and the immediately preceding value of the adaptive offset value Uvex_oft_adp to a limiting process using Eps_ve as an upper limit value and −Eps_ve as a lower limit value. It should be noted that the value Eps_ve is set to a predetermined positive value.

Next, the adaptive offset value Uvex_oft_adp is calculated by subjecting the thus calculated unprocessed value Uvex_oft_adp' to a limiting process shown in the following equations (112) to (115):

$$Uvex\_oft\_adp(k)=Lim(Uvex\_oft\_adp'(k)) \quad (112)$$

WHEN Uvex_oft_max≦Uvex_oft adp'(k), $$Lim(Uvex\_oft\_adp'(k))=Uvex\_oft\_\text{max} \quad (113)$$

WHEN Uvex_oft_min<Uvex_oft adp'(k)<Uvex_oft_max, $$Lim(Uvex\_oft\_adp'(k))=Uvex\_oft\_adp(k) \quad (114)$$

WHEN Uvex_oft_adp'(k)≦Uvex_oft_min, $$Lim(Uvex\_oft\_adp'(k))=Uvex\_oft\_\text{min} \quad (115)$$

In the equation (112), Lim(Uvex_oft_adp') represents a limiting function, and the value thereof is defined as in the equations (113) to (115). Further, Uvex_oft_max in the equation (113) represents a predetermined upper limit value, and Uvex_oft_min in the equation (115) represents a predetermined lower limit value. As described above, the adaptive offset value Uvex_oft_adp is calculated by subjecting the unprocessed value Uvex_oft_adp' to the limiting process. Therefore, the adaptive offset value Uvex_oft_adp is calculated as a value which gently follows a change in the follow-up control input Rsld_ve and exceeds neither the upper limit value Uvex_oft_max nor the lower limit value Uvex_oft_min.

Further, the subtractor 305 calculates the reference input r1_ve as the difference between the follow-up control input Rsld_ve and the adaptive offset value Uvex_oft_adp, as shown in the equation (116). It should be noted that in the present embodiment, the reference input r1_ve corresponds to one input component, and the adaptive offset value Uvex_oft_adp to an input component other than the one input component.

$$r1\_ve(k)=Rsld\_ve(k)-Uvex\_oft\_adp(k) \quad (116)$$

Then, the limiter 306 calculates the limited value r2_ve by subjecting the reference input r1_ve to a limiting process as shown in the following equations (117) to (120):

$$r2\_ve(k)=Lim(r1\_ve(k)) \quad (117)$$

WHEN r1_ve_max ≦ r1_ve(k), $$Lim(r1\_ve(k))=r1\_ve\_max \quad (118)$$

WHEN r1_ve_min < r1_ve(k) < r1_ve_max, $$Lim(r1\_ve(k))=r1\_ve(k) \quad (119)$$

WHEN r1_ve(k) ≦ r1_ve_min, $$Lim(r1\_ve(k))=r1\_ve\_min \quad (120)$$

In the equation (117), Lim(r1_ve) represents a limiting function, and the value is defined as shown in equations (118) to (120). The symbol r1 ve_max in this equation (118) represents a predetermined upper limit value, and r1_ve_min in the equation (120) represents a predetermined lower limit value.

Further, the oversampler 307 calculates an oversampled value r2_ve(n1) by oversampling the limited value r2_ve at the predetermined control period ΔT1.

Further, the first modulation section 308 calculates a first modulated value u1_ve by modulating the oversampled value r2_ve(n1) of the limited value with a modulation algorithm which is based on the Δ Σ modulation algorithm and expressed by the following equations (121) to (125):

$$\delta1\_ve(n1)=r2\_ve(n1)-u1\_ve(n1-1) \quad (121)$$

$$\sigma1\_ve(n1)=\sigma1\_ve(n1-1)+\delta1\_ve(n1) \quad (122)$$

$$u1\_ve(n1)=fnl(\sigma1\_ve(n1)) \quad (123)$$

WHEN σ1_ve(n1) ≧ 0, $$fnl(\sigma1\_ve(n1))=R1\_ve \quad (124)$$

WHEN σ1_ve(n1) < 0, $$fnl(\sigma1\_ve(n1))=-R1\_ve \quad (125)$$

As shown in the equation (121), the difference δ1_ve is calculated as the difference between the present value of the oversampled value r2_ve of the limited value and the immediately preceding value of the first modulated value u1_ve. Further, in the equation (122), σ1_ve represents an integral value of the difference δ1_ve. Further, in the equation (123), fnl(σ1_ve) represents a nonlinear function whose value is defined as in the equations (124) and (125) (it may be defined that when σ1_ve=0, fnl(σ1_ve)=0 holds.)

Further, R1_ve in the equations (124) and (125) is set to such a predetermined positive value as will always satisfy the relationship of R1_ve>|r2_ve|, and make the amplitude 2·R1_ve of the first modulated value u1_ve smaller than a range between the maximum value and the minimum value which the follow-up control input Rsld_ve can assume during the control. It should be noted that the value R1_ve may be calculated by searching a table or a map according to operating conditions of the engine 3. As is clear from the equations (121) to (125), the first modulated value u1_ve is calculated as a value which is repeatedly inverted between a predetermined value −R1_ve and a predetermined value R1_ve.

Next, the oversampler 309 calculates an oversampled value u1_ve(m) of the first modulated value u1_ve by oversampling the first modulated value u1_ve at the predetermined control period ΔTu.

On the other hand, the oversampler 310 calculates an oversampled value r2_ve(n2) of the limited value r2_ve by oversampling the limited value r2_ve at the predetermined control period ΔT2.

Further, the second modulation section 311 calculates a second modulated value u2_ve by modulating the oversampled value r2_ve(n2) of the limited value with a modulation algorithm which is based on the Δ Σ modulation algorithm and expressed by the following equations (126) to (130):

$$\delta2\_ve(n2)=r2\_ve(n2)-u2\_ve(n2-1) \quad (126)$$

$$\sigma2\_ve(n2)=\sigma2\_ve(n2-1)+2\_ve(n2) \quad (127)$$

$$u2\_ve(n2)=fnl(\sigma2\_ve(n2)) \quad (128)$$

WHEN σ2_ve(n2) ≧ 0, $$fnl(\sigma2\_ve(n2))=R2\_ve \quad (129)$$

WHEN σ1_ve(n2) < 0, $$fnl(\sigma2\_ve(n2))=-R2\_ve \quad (130)$$

As shown in the equation (126), the difference δ2_ve is calculated as the difference between the present value of the oversampled value r2_ve and the immediately preceding value of the second modulated value u2_ve. Further, in the equation (127), u2_ve represents an integral value of the difference δ2_ve. Also, in the equation (128), fnl(σ2_ve) is a nonlinear function as defined in the equations (129) and (130) (it may be defined that when σ2_ve=0, fn1(σ2_ve)=0 holds).

Further, R2_ve in the equations (129) and (130) is set to such a predetermined positive value as will always satisfy the relationship of R2_ve>|r2_ve| during the control and make the amplitude 2·R2_ve of the second modulated value u2_ve smaller than a range between the maximum value and the minimum value which the follow-up control value Rsld_ve can assume during the control. It should be noted that the value R2_ve may be calculated by searching a table or a map according to operating conditions of the engine 3. As is clear from the equations (126) to (130), the second modulated value u2_ve is calculated as a value which is repeatedly inverted between the predetermined value −R2_ve and the predetermined value R2_ve.

Next, the oversampler 312 calculates an oversampled value u2_ve(m) by oversampling the second modulated value u2_ve at a predetermined control period ΔTu.

Figure 27:
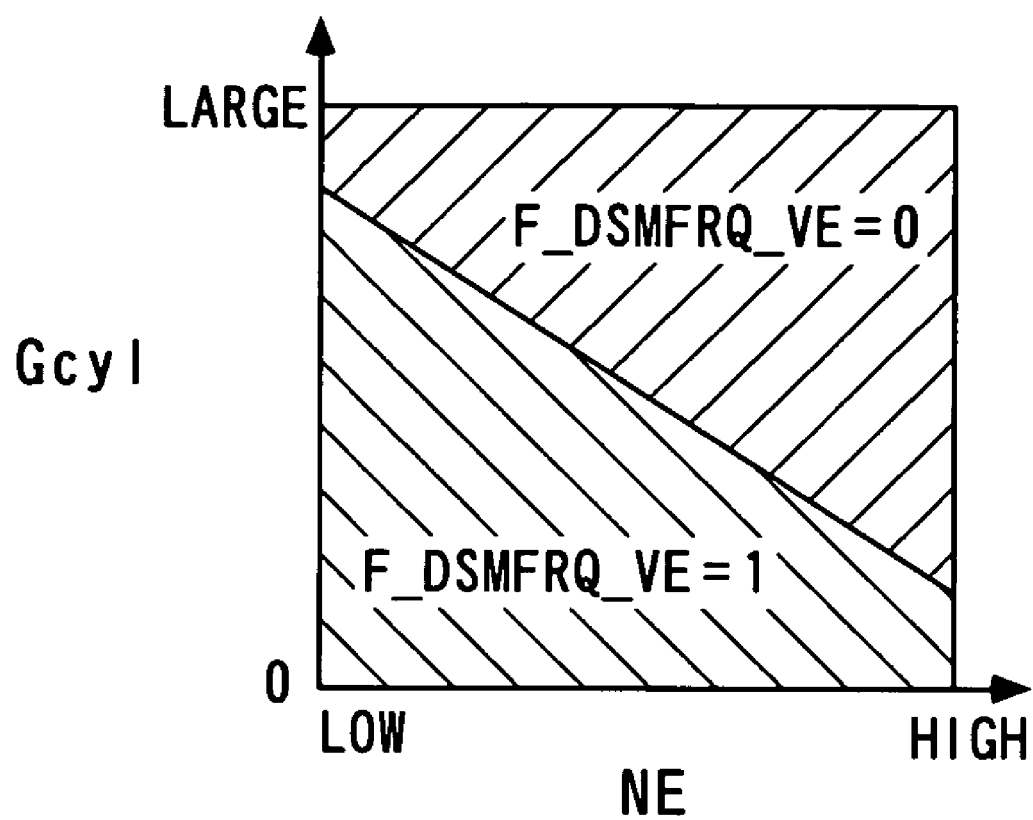
FIG. 27 is a diagram showing an example of a map for use in setting a modulated value selection flag F_DSMFRQ_VE.

Further, the state determination section 313 sets a modulated value selection flag F_DSMFRQ_VE to 1 or 0 by searching maps shown in FIG. 27 according to the engine speed NE and the intake air amount Gcyl. It should be noted that in the present embodiment, the engine speed NE and the intake air amount Gcyl correspond to parameters indicative of a state of the controlled object.

As shown in FIG. 27, this map is configured such that in a region where the engine speed NE is low and at the same time the intake air amount Gcyl is small (i.e. in a low-load region), F_DSMFRQ VE=1 holds, whereas in a region where the engine speed NE is high and at the same time the intake air amount Gcyl is large (i.e. in a high-load region), F_DSMFRQ_VE=0 holds.

This is for the following reason: In the region where the engine speed NE is low and the intake air amount Gcyl is small, as the interval of the combustion cycle of each cylinder 3a becomes longer, the dead time of the actual air-fuel ratio Vex responsive to the target air-fuel ratio Uvex becomes longer, and hence in such a state, if the modulated value u_ve is calculated at a short repetition period, there is a fear that the control resolution is lowered. Therefore, the map is configured such that F_DSMFRQ_VE=1 holds in the region where the engine speed NE is low and the intake air amount Gcyl is small, so as to avoid the above inconvenience by calculating the modulated value u_ve at the longer repetition period ΔT1.

On the other hand, in the region where the engine speed NE is high and at the same time the intake air amount Gcyl is large, the sensitivity of the actual air-fuel ratio Vex to the high-frequency components of the air-fuel ratio control input Uvex becomes high, and hence if the modulated value u_ve is calculated at the longer repetition period in such a region, there is a fear that the inverting behavior of the air-fuel ratio control input Uvex is reflected in the actual air-fuel ratio Vex in a noise-like fashion. Therefore, the map is configured such that F_DSMFRQ_VE=0 holds in the region where the engine speed NE is high and at the same time the intake air amount Gcyl is large, so as to avoid the above-described inconvenience by calculating the modulated value u_ve at the shorter repetition period ΔT2.

Next, the modulated value-selecting section 314 calculates the modulated value u_ve by the following equations (131) and (132) according to the modulated value selection flag F_DSMFRQ_VE set by the state determination section 313. That is, one of the first modulated value u1_ve and the second modulated value u2_ve is selected as the modulated value u_ve.

WHEN F_DSMFRQ=1, $$u\_ve(m)=u1\_ve(m) \quad (131)$$

WHEN F_DSMFRQ=0, $$u\_ve(m)=u2\_ve(m) \quad (132)$$

On the other hand, the oversampler 315 calculates an oversampled value Uvex_oft_adp(m) of the adaptive offset value by oversampling the adaptive offset value Uvex_oft_adp calculated by the adaptive offset value-calculating section 304 at the predetermined repetition period ΔTu.

Next, the adder 316 calculates the air-fuel control input Uvex by the following equation (133):

$$Uvex(m)=u\_ve(m)+Uvex\_oft\_adp(m) \quad (133)$$

According to the control apparatus 1A of the second embodiment configured as above, the air-fuel ratio controller 300 selects the first modulated value u1_ve calculated at the longer repetition period ΔT1 as the modulated value u_ve when the modulated value selection flag F_DSMFRQ_VE is equal to 1, and the second modulated value u2_ve calculated at the shorter repetition period ΔT2 as the modulated value u_ve when the modulated value selection flag F_DSMFRQ_VE is equal to 0, and calculates the air-fuel ratio control input Uvex based on the thus selected modulated value u_ve. On the other hand, the value of the modulated value selection flag F_DSMFRQ_VE is set such that F_DSMFRQ_VE=0 holds in the region where the engine speed NE is high and at the same time the intake air amount Gcyl is large, and F_DSMFRQ_VE=1 holds in the region where the engine speed NE is low and the intake air amount Gcyl is small.

Therefore, in the region where the engine speed NE is high and at the same time the intake air amount Gcyl is large, i.e. in the region where the sensitivity of the actual air-fuel ratio Vex to the high-frequency components of the air-fuel ratio control input Uvex is high, the air-fuel ratio control input Uvex is calculated at the shorter repetition period ΔT2, and hence, it is possible to eliminate the inconvenience occurring when the air-fuel ratio control input Uvex is calculated at the longer repetition period in such a region, i.e. the inconvenience of the inverting behavior of the air-fuel ratio control input Uvex being reflected in the actual air-fuel ratio Vex in a noise-like fashion, whereby it is possible to maintain the control resolution and the control accuracy at respective high levels. On the other hand, in the region where the engine speed NE is low and at the same time the intake air amount Gcyl is small, i.e. in the region where the dead time of the actual air-fuel ratio Vex responsive to the target air-fuel ratio Uvex is long, it is possible to eliminate the inconvenience occurring when the air-fuel ratio control input Uvex is calculated at the shorter repetition period in such a region, i.e. the inconvenience of the control resolution of the air-fuel ratio control being lowered, whereby it is possible to maintain the control resolution and the control accuracy at respective high levels.

Further, the air-fuel ratio control input Uvex is calculated, as described hereinabove, as a value which is inverted with an amplitude of 2·R1_ve or 2·R2_ve with the adaptive offset value Uvex_oft_adp as the center of the inversion, and the adaptive offset value Uvex_oft_adp is calculated as a value which gently follows a change in the follow-up control input Rsld_ve, and exceeds neither the upper limit value Uvex_oft_max nor the lower limit value Uvex_oft_min. Therefore, even when there occurs a state in which the actual air-fuel ratio Vex largely deviates from the target air-fuel ratio Vex_cmd, and the range of variation in the follow-up control input Rsld_ve is large, differently from the case where the central value of the amplitude of the air-fuel ratio control input Uvex is not changed, it is possible to cause the actual air-fuel ratio Vex to follow the target air-fuel ratio Vex_cmd while avoiding the air-fuel control input Uvex from becoming excessively large. As a result, it is possible to further enhance the control resolution and the control accuracy.

What is more, the modulated value u_ve is calculated by modulating the limited value r2_ve obtained by subjecting the difference between the follow-up control input Rsld_ve and the adaptive offset value Uvex_oft_adp to the limiting process, with the modulation algorithm based on the Δ Σ modulation algorithm. Therefore, the air-fuel ratio control input Uvex is calculated as a value which is higher in inverting frequency as the actual air-fuel ratio Vex becomes closer to the target air-fuel ratio Vex_cmd. This makes it possible to improve the convergence of the actual air-fuel ratio Vex to the target air-fuel ratio Vex_cmd compared with the case in which the air-fuel ratio control input Uvex is calculated by PWM or dithering with a fixed inverting frequency.

Although in the above-described embodiments, the control apparatus according to the present invention is applied to control apparatuses that carry out cam phase control, valve lift control, and air-fuel ratio control, by way of example, this is not limitative, but the control apparatus according to the present invention may be applied to various industrial apparatuses and devices.

Further, although in the embodiments, the controllers 100, 200, and 300 are each implemented by the ECU 2, by way of example, it is to be understood that each controller may be formed in its entirety or partially by an electric circuit.

It is further understood by those skilled in the art that the foregoing are preferred embodiments of the invention, and that various changes and modifications may be made without departing from the spirit and scope thereof.

What is claimed is:

1. A control apparatus for controlling a controlled variable of a controlled object by a control input, comprising:

controlled variable-detecting means for detecting the controlled variable;

target value-setting means for setting a target value as a target of the controlled variable;

follow-up control input-calculating means for calculating a follow-up control input for controlling the detected controlled variable such that the detected controlled variable is caused to follow the set target value, with a predetermined control algorithm; and control input-calculating means for calculating the control input by modulating the calculated follow-up control input with algorithms including a predetermined modulation algorithm, and selecting a repetition period at which the control input is calculated from a plurality of predetermined repetition periods, according to a parameter indicative of a state of the controlled object.

2. A control apparatus as claimed in claim 1, wherein said control input-calculating means divides the follow-up control input into a plurality of input components, and calculates the control input based on an input component formed by modulating one of the input components with the predetermined modulation algorithm and other input components than the one input component.

3. A control apparatus as claimed in claim 1, wherein said predetermined algorithm is based one of a $\Delta\Sigma$ modulation algorithm, a $\Sigma\Delta$ modulation algorithm, and a $\Delta$ modulation algorithm.

4. A control apparatus as claimed in any one of claims 1 to 3, wherein said controlled variable is a phase of at least one of an intake camshaft and an exhaust camshaft of an internal combustion engine, relative to a crankshaft of the engine.

5. A control apparatus as claimed in any one of claims 1 to 3, wherein said controlled variable is a lift of at least one of each of intake valves and each of exhaust valves of an internal combustion engine.

6. A control apparatus as claimed in any one of claims 1 to 3, wherein said controlled variable is an air-fuel ratio parameter indicative of an air-fuel ratio of a mixture supplied to an internal combustion engine.

* * * * *